US007900146B2

(12) United States Patent
Kozuka et al.

(10) Patent No.: US 7,900,146 B2

(45) Date of Patent: Mar. 1, 2011

(54) IMAGE FORMING SYSTEM, INFORMATION PROCESSING APPARATUS AND ITS CONTROL METHOD

(75) Inventors: Yasuhiro Kozuka, Tokyo (JP); Masayuki Sakura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 1349 days.

(21) Appl. No.: 11/407,915

(22) Filed: Apr. 21, 2006

(65) Prior Publication Data

US 2006/0239708 A1 Oct. 26, 2006

(30) Foreign Application Priority Data

Apr. 26, 2005 (JP) ................................ 2005-128621

(51) Int. Cl.
*G06F 3/00* (2006.01)

(52) U.S. Cl. ........................ 715/733; 358/1.13; 358/1.14

(58) Field of Classification Search .................. 715/733; 358/1.13, 1.14
See application file for complete search history.

(56) References Cited

U.S. PATENT DOCUMENTS 6,236,464 B1 * 5/2001 Kohtani et al. .............. 358/1.15
2001/0055123 A1 * 12/2001 Ryan et al. .................. 358/1.12
2002/0120742 A1 * 8/2002 Cherry .......................... 709/226
2003/0011822 A1 * 1/2003 Kujirai et al. ................ 358/1.18
2003/0053129 A1 * 3/2003 Morooka et al. ............. 358/1.15
2003/0231328 A1 * 12/2003 Chapin et al. ................ 358/1.13
2004/0046992 A1 * 3/2004 Mori et al. ................... 358/1.15
2004/0111675 A1 * 6/2004 Mori et al. .................... 715/513
2004/0190032 A1 * 9/2004 Ferlitsch ...................... 358/1.13
2005/0275852 A1 * 12/2005 Ferlitsch ....................... 358/1.6
2006/0238777 A1 10/2006 Anno et al.
2006/0238793 A1 10/2006 Akashi et al.

FOREIGN PATENT DOCUMENTS

JP 2001-125765 5/2001
JP 2004-78449 3/2004

* cited by examiner

*Primary Examiner* — Weilun Lo
*Assistant Examiner* — Tuyetlien T Tran
(74) *Attorney, Agent, or Firm* — Fitzpatrick, Cella, Harper & Scinto

(57) ABSTRACT

An information processing apparatus, connectable to an information forming system having plural devices corresponding to plural processing stages including at least a printing stage and a bookbinding stage. Function information indicating abilities regarding plural function items of the plural devices are held, and a user interface for function selection is provided by displaying options based on contents of the function items of plural devices corresponding to one processing stage in accordance with the held function information. Then, available devices are narrowed down based on the selection of the options, and a device to be used in the processing stage is determined.

7 Claims, 24 Drawing Sheets

FIG. 4

```
<!--BOOKBINDER ABILITY INFORMATION-->
<FINISHING>
<FINISHING.FinishingType FinishingType="Bookbinding"/>
<FINISHING. Manufacturer Manufacturer="ABC"/>
<FINISHING.ProductName ProductName="11ABC"/>
        <Booklet>
                <Booklet.BookletTypes Booklet.NumType="6"/>
                        <Booklet.BookletType Booklet.BookletTypeName="SADDLE-STITCH FOLDING"/>
                        <Booklet.BookletType Booklet.BookletTypeName="SIDE STITCHING"/>
                        <Booklet.BookletType Booklet.BookletTypeName="CORNER STITCHING"/>
                        <Booklet.BookletType Booklet.BookletTypeName="TWO-FOLDING"/>
                        <Booklet.BookletType Booklet.BookletTypeName="SIDE-STITCH FOLDING"/>
                        <Booklet.BookletType Booklet.BootdetTypeName="CORNER-STITCH FOLDING"/>
                </Booklet.BookletTypes>
        </Booklet>
        <Medium>
                <Medium.Type NumMediumType="2">
                        <Medium.Type MediumTypeName="Plain"/>
                        <Medium.Type MediumTypeName="Fine"/>
                <Medium.Type>
                <Medium.Weight MediumWeightCriterion="4-6Size">
                        <Medium.Weight MediumWeightMin="60kg">
                        <Medium.Weight MediumWeightMax="120kg">
                </Medium.Weight>
        </Medium>
        <StapleSpaceInterval>
                <StapleSpaceInterval.Adjust Adjustable="FALSE"/>
                <StapleSpaceInterval.Interval Interval="100mm"/>
        </StapleSpaceInterval>
</FINISHING>
```

FIG. 5

```
<!--CUTTING MACHINE ABILITY INFORMATION-->
<FINISHING>
<FINISHING.FinishingType FinishingType="Cutting"/>
<FINISHING.Manufacturer Manutacturer="XYZ"/>
<FINISHING.ProductName ProductName="10XYZ"/>
        <Cutting >
                <MaxInputDimensions>
                        <MaxInputDimensions.X X="360mm"/>
                        <MaxInputDimensions.Y Y="360mm"/>
                </MaxInputDimensions>
                <MaxOutputDimenstons>
                        <MaxOutputDimensions.X X="310mm"/>
                        <MaxOutputDimensions.Y Y="310mm"/>
                </MaxOutputDimensions>
                <MinOutputDimensions>
                        <MinOutputDimensions.X X="80mm"/>
                        <MinOutputDimensions.Y Y="150mm"/>
                </MinOutputDimensions>
                <MaxThickness Thickness="70mm"/>
        </Cutting >
</FINISHING>
```

FIG. 7

52

| 101 # (Unsigned short) | 102 Finisher Name (String) | 103 Manufacturer (String) | 104 Profile Name (String) | 105 Connected (Boolean) |
|---|---|---|---|---|
| 1 | Finisher-A | ABC | finisher-a-of-abc.xml | false |
| 2 | Finisher-B | ABC | finisher-b-of-abc.xml | false |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | false |
| 7 | Finisher-Z | XYZ | finisher-z-of-xyz.xml | false |
| : | : | : | : | : |

FIG. 11A

131

PRINTING TABLE

| | COLOR SELECTION | PRINTING SPEED (MIN) | PAPER SIZE | ··· |
|---|---|---|---|---|
| IMAGE FORMING APPARATUS (13) | COLOR / BW | 100 | A4, A3, ··· | ··· |
| IMAGE FORMING APPARATUS (14) | BW | 20 | A4 | ··· |

FIG. 11B

132

BOOKBINDING TABLE

| | CONNECTED PRINTER | AVAILABLE PAPER SIZE | STITCHING FUNCTION | NUMBER OF SHEETS | ··· |
|---|---|---|---|---|---|
| IN-LINE FINISHER (13a) | IMAGE FORMING APPARATUS (13) | A4, A3, ··· | SIDE STITCHING | 16 | ··· |
| NEAR-LINE FINISHER (15) | – | A4, A3, ··· | SADDLE STITCHING, SIDE STITCHING | 50 | ··· |

FIG. 23

52

| # (Unsigned short) 101 | Finisher Name (String) 102 | Manufacturer (String) 103 | Profile Name (String) 104 | Connected (Boolean) 105 |
|---|---|---|---|---|
| 1 | Finisher-A | ABC | finisher-a-of-abc.xml | true |
| 2 | Finisher-B | ABC | finisher-b-of-abc.xml | true |
| 3 | Finisher-C | ABC | finisher-c-of-abc.xml | false |
| 4 | Binder-ABC | ABC | binder-abc-of-abc.xml | false |
| 5 | Finisher-X | XYZ | finisher-x-of-xyz.xml | true |
| 6 | Finisher-Y | XYZ | finisher-y-of-xyz.xml | true |
| 7 | Finisher-Z | XYZ | finisher-z-of-xyz.xml | false |
| : | : | : | : | : |

FIG. 24

| BOOKBINDING TABLE | | | | | | | | | |
|---|---|---|---|---|---|---|---|---|---|
| | CONNECTED PRINTER | AVAILABLE PAPER SIZE | STITCHING FUNCTION | FOLDING FUNCTION | CUTTING FUNCTION | NUMBER OF SHEETS | BOOKBINDING SPEED | COVER SIZE | ··· |
| IN-LINE FINISHER (13a) | IMAGE FORMING APPARATUS (13) | A4, A3, ··· | SIDE STITCHING | – | – | 16 | – | – | |
| NEAR-LINE FINISHER (15) | – | A4, A3, ··· | SADDLE STITCHING, SIDE STITCHING | – | – | 50 | – | – | |
| NEAR-LINE FINISHER (17) | – | MAXIMUM : 310(WIDTH) × 226(HEIGHT) MM MINIMUM : 105(WIDTH) × 148(HEIGHT) MM | CASE BOOKBINDING | – | – | 500 | – | MAXIMUM : 315(WIDTH) × 480(HEIGHT) MM MINIMUM : 105(WIDTH) × 148(HEIGHT) MM | |
| NEAR-LINE FINISHER (18) | – | MAXIMUM : 310(WIDTH) × 226(HEIGHT) MM MINIMUM : 105(WIDTH) × 148(HEIGHT) MM | – | – | SIMULTANEOUS 3-SIDE CUTTING | 100 | – | – | |
| NEAR-LINE FINISHER (19) | – | MAXIMUM : 310(WIDTH) × 226(HEIGHT) MM MINIMUM : 105(WIDTH) × 148(HEIGHT) MM | – | TWO-FOLDING | – | 25 | – | – | |

IMAGE FORMING SYSTEM, INFORMATION PROCESSING APPARATUS AND ITS CONTROL METHOD

FIELD OF THE INVENTION

The present invention relates to an image forming system having an image forming apparatus, a client computer and a network connecting these devices, and more particularly, to a technique for utilization of a postprocessing device existing on such network.

BACKGROUND OF THE INVENTION

Generally, a printing system in which an image forming apparatus and a client computer are connected with each other, having finishers for cutting, bookbinding and the like, is known. In this type of printing system, various settings regarding finishers can be made upon generation of a print job, by utilizing characteristic information of postprocessing devices (finishers) available in the system. As methods for utilizing the finisher characteristic information upon generation of print job, (1) a method for controlling printing attribute (s) upon printing and (2) a method for controlling user interface function items of a printer driver, and the like are known.

In the above method (1), i.e., the method for controlling printing attribute(s) upon printing by utilizing the finisher characteristic information, a method for automatically setting printing attribute(s) by a printer driver in correspondence with the finisher characteristic information upon generation of print job is known. According to Japanese Patent Application Laid-Open No. 2004-078449, the printer driver obtains the following two items regarding a bookbinder:

"Pick up from 'top' or 'bottom' of set document stack"; and

"Set document faced-up or faced down".

Then the printer driver automatically performs setting of a page output order (ascending/descending) and page output surface (faced up/faced down) based on the two items of information so as to set a print output on the bookbinder and normally perform bookbinding processing. By this printer driver's control, it is unnecessary for a user to grasp these two items of information regarding the bookbinder.

Further, as the above method (2), a method for controlling the user interface function items of the printer driver by utilizing the finisher characteristic information has been proposed. In this method, the type of a finisher attached to a printer is manually or automatically identified, thereby the user interface function items can be controlled.

Further, Japanese Patent Application Laid-Open No. 2001-125765 discloses a user's selection of a bookbinding format, then converting print data for bookbinding in accordance with the bookbinding format selected by the user, then print-outputting the print data for bookbinding converted in accordance with the bookbinding format, and outputting a bookbinding original copy. According to Japanese Patent Application Laid-Open No. 2001-125765, a preview screen of bookbinding product, generated based on the bookbinding format designated by the user, is displayed. Accordingly, the user's desired bookbinding original copy can be outputted without mistake, and improvement in working efficiency, cost reduction and resource conservation can be realized.

As described above, when printing is performed using a printer driver, the contents of works performed by the image forming apparatus such as a printer or a multi function peripheral device (MFP) and an in-line finisher connected to the apparatus can be set on a setting screen of the printer driver and print instruction can be performed. That is, the both image forming apparatus and in-line finisher can be controlled from the printer driver. Note that the in-line finisher is a postprocessing device which is physically connected with the image forming apparatus, as an optional device of the image forming apparatus, and which conveys a printed matter outputted by the image forming apparatus to the finisher without manual operation. Further, the in-line finisher by itself cannot perform communication with a host computer, however, the finisher can generate a print job where the content of processing in the finisher (for example, staple processing) is designated using the image forming apparatus or the printer driver.

However, for the user, to select such many devices and perform desired settings of these devices, it is necessary and troublesome to grasp functions of the devices and settings to be made. Accordingly, when the settings are complicated or when some settings have been omitted, outputting is performed again. Thus wasteful output may occur.

Further, in some cases, bookbinding work is performed by using a postprocessing device such as a near-line finisher or an off-line finisher to which a paper sheet outputted from the image forming apparatus is not automatically conveyed, in addition to the in-line finisher. Note that the near-line finisher has a unit for communication with an external device such as a computer or the image forming apparatus, and the content of processing by the finisher can be set from the external device. That is, in the near-line finisher, the content of processing can be set from an operation unit of the finisher, and further, the content of processing (job ticket) can be inputted and set from another device such as the host computer via the network. Note that the near-line finisher, which is different from the in-line finisher, is not physically connected with the image forming apparatus. A paper sheet outputted from the image forming apparatus is conveyed by an operator. Further, the off-line finisher is a postprocessing device which is not physically connected with the external device as in the case of the near-line finisher, and which has no unit for communication with the external device as in the case of the near-line finisher.

When the postprocessing device such as the near-line finisher or the off-line finisher is used, the abilities of these postprocessing devices cannot be recognized on the driver side, while the recognition of the abilities of the in-line finisher are considered as options upon printer driver design. Accordingly, it is necessary for the operator to determine a device to obtain a finally desired bookbinding form and perform print settings while imagining processings executed in the respective postprocessing devices. The operator's higher-level knowledge and experiences are required.

On the other hand, Japanese Patent Application Laid-Open No. 2001-125765 discloses setting bookbinding data as an original copy of bookbinding product through plural selection screen images. However, in the technique disclosed in Japanese Patent Application Laid-Open No. 2001-125765, the operability for a user, who has an image of final book-bound product but who cannot perform determination of a device to be used and perform setting of the device based on the image, is not considered. According to the technique disclosed in Japanese Patent Application Laid-Open No. 2001-125765, an output format is selected in a predetermined bookbinder, and the output format processed based on settings selected by the user is displayed as a preview screen. Further, processing when the system configuration becomes complicated or changed is not disclosed. Further, when plural postprocessing devices are available, or when a new postprocessing device is added to the system and the number of available bookbinding formats is increased, processing cannot be performed in a flexible manner in accordance with such situation.

SUMMARY OF THE INVENTION

The present invention has been made in consideration of the above problems, and has its object to facilitate selection and setting of a device necessary to obtain a desired final product.

According to one aspect of the present invention, there is provided an information processing apparatus connectable to an image forming system having plural devices corresponding to plural processing stages including at least printing stage and bookbinding stage, comprising: a holding unit configured to hold function information indicating abilities regarding plural function items of the plural devices; an interface unit configured to provide a user interface for displaying options based on contents of the function items of plural devices corresponding to one processing stage in accordance with the function information held in the holding unit; a narrow-down unit configured to narrow down available devices based on selection of the options; and a determination control unit configured to cause the interface unit and the narrow-down unit to function regarding different function items, more than once, for one processing stage, and determine a device to be used in the processing stage.

A printing system according to a first embodiment to be described below has image forming apparatuses, finishers, client computers in which a printer driver is installed, and a network connecting these devices. In the printing system, the printer driver performs finisher setting processing using a file describing the characteristic of a finisher. Further, in the present embodiment, as a wizard-format setting screen is provided, a user can determine a finisher to be used and an image forming apparatus, and can perform print setting by appropriately performing setting through the setting screen based on a desired final output form.

Also, according to another aspect of the present invention, there is provided an image forming system having plural devices corresponding to plural processing stages including at least printing stage and bookbinding stage, comprising: a holding unit configured to hold function information of the plural devices; an interface unit configured to provide a user interface for displaying options based on contents of the function items of plural devices corresponding to one processing stage in accordance with the function information held in the holding unit; a narrow-down unit configured to narrow down available devices based on selection of the options; and a determination control unit configured to cause the interface unit and the narrow-down unit to function regarding different function items, more than once, for one processing stage, and determine a device to be used in the processing stage.

Furthermore, according to another aspect of the present invention, there is provided a control method for an information processing apparatus connectable to an image forming system having plural devices corresponding to plural processing stages including at least printing stage and bookbinding stage, comprising: an interface step of referring to a holding unit holding function information indicating abilities regarding plural function items of the plural devices, and providing a user interface for displaying options based on contents of the function items of plural devices corresponding to one processing stage; a narrow-down step of narrowing down available devices based on selection of the options; and a determination control step of performing the interface step and the narrow-down step regarding different function items, more than once, for one processing stage, and determining a device to be used in the processing stage.

Other features and advantages of the present invention will be apparent from the following description taken in conjunction with the accompanying drawings, in which like reference characters designate the same name or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is an example of a description of a finisher profile of a bookbinder;

FIG. 5 is an example of a description of the finisher profile of a cutting machine;

FIG. 7 is a table showing the data structure of a finisher management table 52;

FIG. 11A is an table showing the data structure of a function table (printing table) according to the first embodiment;

FIG. 11B is a table showing the data structure of a function table (bookbinder table) according to the first embodiment;

FIG. 23 is a table showing the data structure of a finisher management table corresponding to the system configuration in FIG. 18; and FIG. 24 is a table showing the data structure of the function table corresponding to the system configuration in FIG. 18.

DETAILED DESCRIPTION OF THE PREFERRED EMBODIMENTS

Preferred embodiments of the present invention will now be described in detail in accordance with the accompanying drawings.

First Embodiment

A printing system according to a first embodiment to be described below has image forming apparatuses, finishers, client computers in which a printer driver is installed, and a network connecting these devices. In the printing system, the printer driver performs finisher setting processing using a file describing the characteristic of a finisher. Further, in the present embodiment, as a wizard-format setting screen is provided, a user can determine a finisher to be used and an image forming apparatus and perform print setting by appropriately performing setting through the setting screen based on a desired final output form.

[System Configuration]

Figure 1:
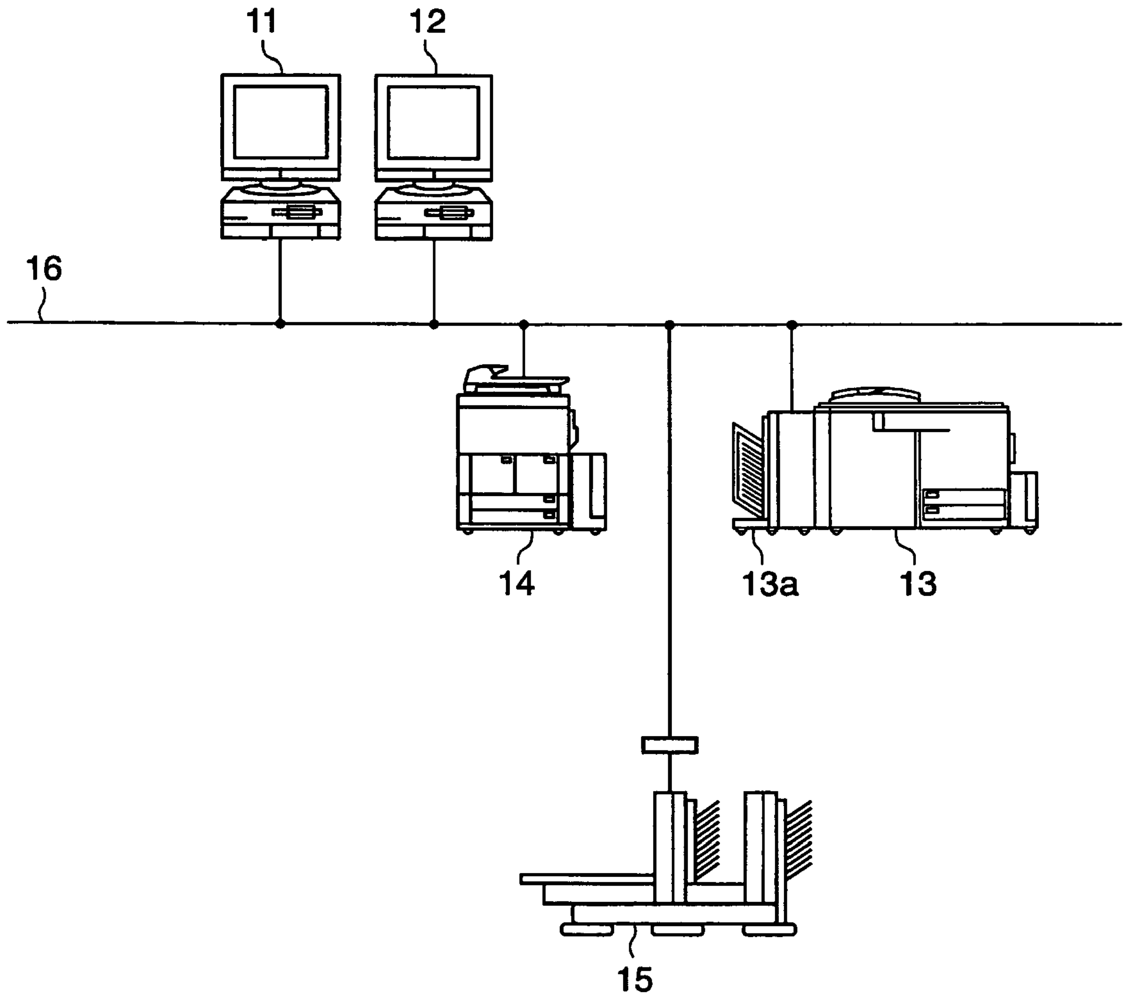
FIG. 1 illustrates the configuration of a printing system according to a first embodiment of the present invention.

FIG. 1 illustrates the configuration of the printing system according to the first embodiment. As shown in FIG. 1, the printing system according to the present embodiment has client PCs 11 and 12 as information processing apparatuses, image forming apparatuses 13 and 14, and a near-line finisher 15 as a saddle-stitch bookbinder. Further, an in-line finisher 13*a* is connected to the image forming apparatus 13. The respective devices are communicably interconnected via a network 16. Note that in the printing system configuration in FIG. 1, an off-line finisher which cannot be connected to the network 16 is not shown, however, the printing system may have an off-line finisher.

As described in the above conventional art, the respective terms, “in-line”, “near-line” and “off-line” will be described again. First, explanations of the respective terms from a viewpoint of finisher processing control will be made. The in-line finisher is a device which cannot perform communication by itself with a host computer, but the content of processing performed in the finisher can be set from the image forming apparatus or the host computer via the image forming apparatus. The off-line finisher is a device which has no unit for communication with an external device, and the content of processing performed in the finisher is set in the finisher itself. The near-line finisher is a device which has a unit for communication with an external device, and the content of processing performed in the finisher can be set in the finisher itself or from another device (e.g., the client PC 11 or 12) via the network.

Further, the features of the “in-line”, “near-line” and “off-line” in a print output conveyance passage (paper path) will be described. The in-line finisher is physically connected to the image forming apparatus. The in-line finisher has a structure where paper print-outputted from the image forming apparatus is passed through the conveyance passage (paper path) to the finisher directly and quickly. The off-line finisher is not physically connected to the image forming apparatus. Paper print-outputted from the image forming apparatus is temporarily buffered on a cart, tray, belt conveyer or the like, then set in an input unit of the finisher by the user. In the near-line finisher, paper is temporarily buffered and set in the input unit of the finisher by the operator as in the case of the off-line finisher.

[Printer Driver Construction]

The client PCs 11 and 12 are realized with a so-called personal computer. As the hardware construction of the personal computer is well known, the illustration and explanation of the hardware construction will be omitted. As the client PCs 11 and 12 have the same structure, only the client PC 11 will be described.

Figure 2:
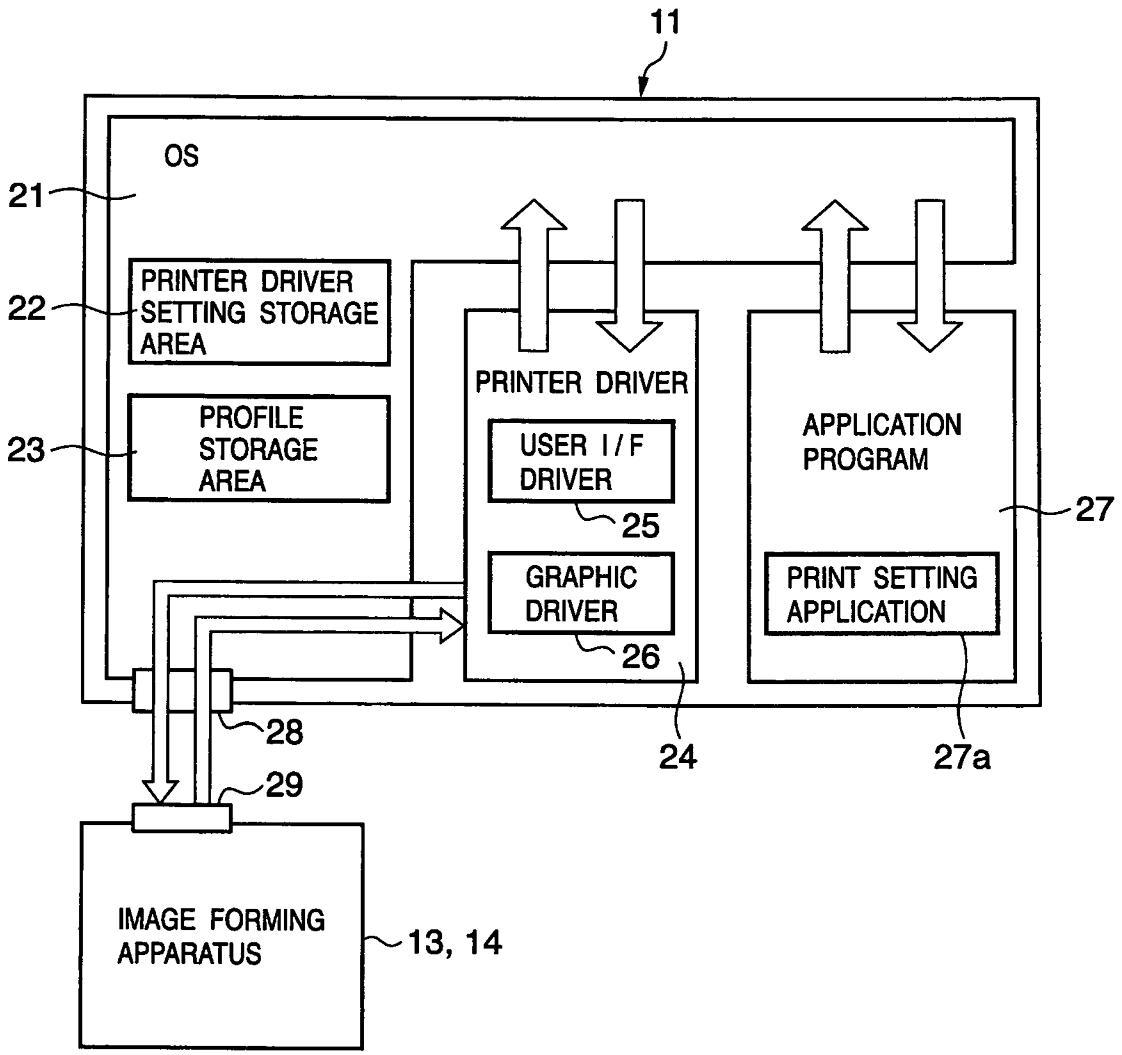
FIG. 2 is a block diagram showing the software construction of client PCs 11 and 12 including a printer driver.

FIG. 2 is a block diagram showing the software construction of the client PC 11 including a printer driver. An operating system (OS) 21 is installed in the client PC 11. The printer driver 24 and an application program 27 are installed on the OS 21, and controlled by the OS 21.

The printer driver 24 has a user I/F driver 25 for display of a user I/F and storage of settings, and a graphic driver 26 which converts a print drawing command received from an application program through the OS to code interpretable for the image forming apparatus. Note that a printer driver setting storage area 22 is provided in a storage area managed by the OS 21. A printing attribute set by the user via the user I/F driver 25 is stored in the printer driver setting storage area 22. Further, the user I/F driver 25, the graphic driver 26, and the application software 27 can access the printer driver setting storage area 22 via the OS 21 and read the printing attribute set by the user. A profile storage area 23 is an area within the OS 21 for storing a finisher profile obtained by the printer driver 24 via the image forming apparatus 13 or directly from a finisher. The finisher profile stored in the profile storage area 23 will be described later with reference to FIGS. 4 and 5.

Further, a communication I/F 28 of the client PC 11 is connected to a communication I/F 29 on the image forming apparatus 13 (and/or 14) side via a communication medium such as the network 16. The graphic driver 26 can transmit print data to the image forming apparatuses 13 and 14 via the OS 21, and can obtain construction information, statuses and the like of the image forming apparatuses 13 and 14 via the OS 21. Note that the image forming apparatuses 13 and 14 are respectively provided with a specialized printer driver.

[Image Forming Apparatus Construction]

Figure 3:
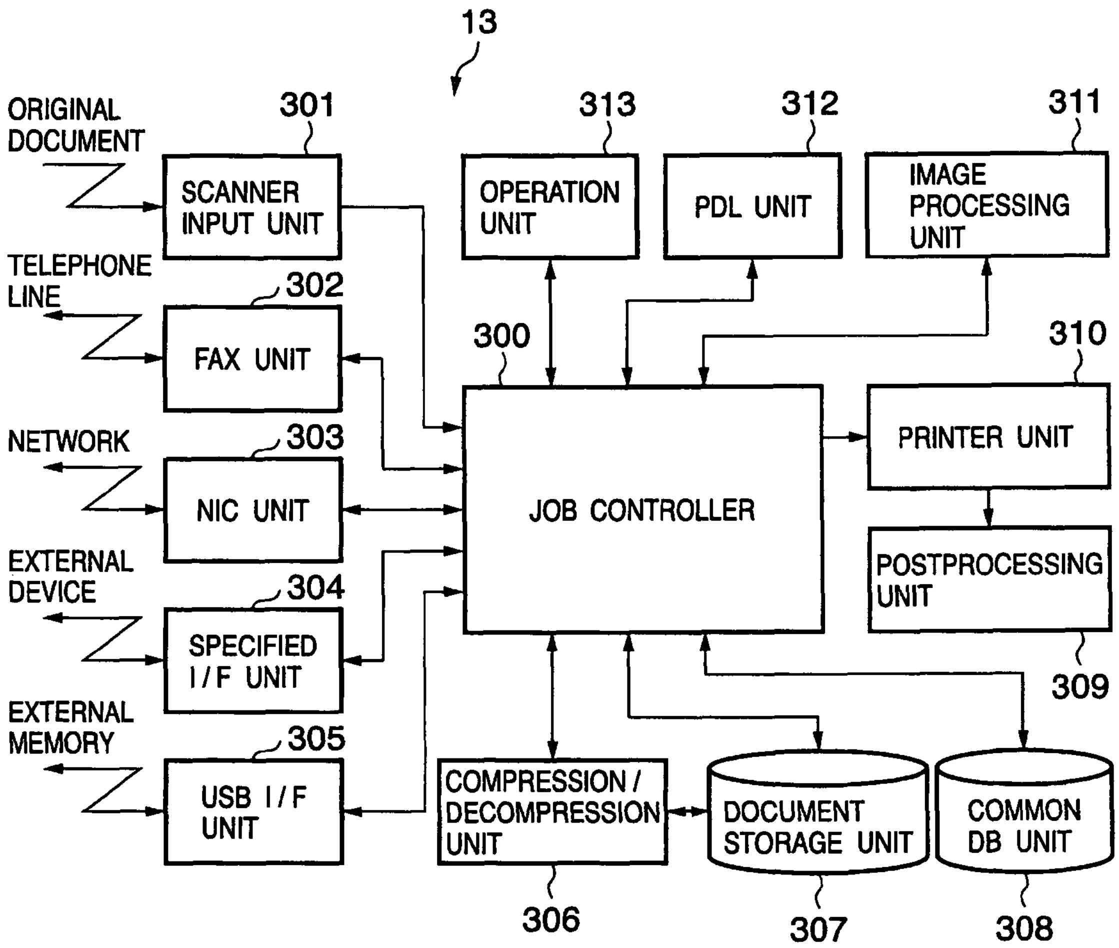
FIG. 3 is a block diagram showing the construction of an image forming apparatus 13 according to the first embodiment.

FIG. 3 is a block diagram showing the construction of the image forming apparatus 13 according to the present embodiment. In the present embodiment, a multifunction peripheral (MFP) device is used as the image forming apparatus 13. As shown in FIG. 3, the image forming apparatus has a scanner input unit 301 which performs image reading and a FAX unit 302 which performs image transmission/reception utilizing a telephone line represented by facsimile communication. Further, the image forming apparatus 13 has a NIC (Network Interface Card) unit 303 which transmits/receives image data, device information and the like utilizing the network. Further, the image forming apparatus 13 has a specialized I/F unit 304 capable of information transmission/reception with another image forming apparatus, the finisher, the host computer or the like. Further, the image forming apparatus 13 has a USB (Universal Serial Bus) interface (I/F) unit 305 for writing and reading to/from a USB device represented by a USB memory. Note that the communication I/F 29 in FIG. 2 corresponds to the NIC unit 303.

A job controller 300 controls a processing process (processing path) to temporarily store image data in accordance with purpose of the image forming apparatus, and appropriately read the stored image data or the like and output the data. Further, the job controller 300 performs various controls based on an instruction from the operator inputted via the operation unit 313. For example, the job controller 300 controls reading of image data stored in a memory such as a hard disk and transfer of the data to the client PCs 11 and 12 or an external device such as another image forming apparatus via the specialized I/F unit 304 or the like.

A document storage unit 307 has a memory such as a hard disk capable of storing plural image data. For example, plural types of image data including image data from the scanner input unit 301, image data of a facsimile job inputted via the FAX unit 302, image data from an external device such as a computer inputted via the NIC unit 303, and image data from another image forming apparatus inputted via the specialized I/F unit 304, can be stored in the memory such as a hard disk. The job controller 300 controls appropriate reading of image data stored in the memory such as a hard disk and transfer of the data to an output unit such as a printer unit 310.

When image data is stored into the document storage unit 307, a compression/decompression unit 306 compresses the image data and stores the compressed image data, or upon reading compressed image data from the storage unit, decompresses the data to original image data, in accordance with necessity. Further, when image data is transmitted via the network, compressed data such as JPEG, JBIG or ZIP data may be used. In such case, when the image data has been inputted into the image forming apparatus, the compression/decompression unit 306 decompresses the compressed data.

A common DB unit 308 holds commonly-used various parameter tables such as font, color profile and gamma tables, and calls them in accordance with necessity. Further, the common DB unit 308 can hold new parameters and tables and correct or update them. For example, registration data regarding a near-line finisher to be newly registered in the image forming apparatus can be stored.

When PDL data has been inputted, the job controller 300 controls a PDL unit 312 to perform RIP (Raster Image Processor) processing, or in accordance with necessity, controls an image processing unit 311 to perform image processing for print outputting. Further, the job controller 300 controls storage of intermediate data and print ready data (print-output bitmap data and compressed data thereof) generated upon such image processing, in accordance with necessity, into the document storage unit 307 again.

Then the job controller 300 sends the above-described print ready data to the printer unit 310. A recording medium (print paper sheet) print-outputted by the printer unit 310 is subjected to finishing processing such as sorting or bookbinding in a postprocessing unit 309. That is, the postprocessing unit 309 includes an in-line finisher.

The job controller 300 performs path switching as follows in accordance with use of image forming apparatus.

Copier function: scanner input unit→image processing unit→printer unit

FAX reception function: FAX unit→image processing unit→printer unit

Network scanning: scanner input unit→NIC unit

Network printing: NIC unit→PDL unit→image processing unit→printer unit

Scanning to external device: scanner input unit→specialized I/F unit

Printing from external device: specified I/F unit→image processing unit→printer unit Scanning to external memory: scanner input unit→USB I/F unit Printing from external memory: USB I/F unit→PDL unit→image processing unit→printer unit Box scanning function: scanner input unit→image processing unit→document storage unit Box printing function: document storage unit→printer unit Box reception function: NIC unit→PDL unit→image processing unit→document storage unit Box transmission function: document storage unit→NIC unit Preview function: document storage unit→operation unit In addition to the above functions, combinations of various functions including E-mail services and a Web server function can be employed, however, they will be omitted here.

Further, the box scanning, the box printing, the box reception and the box transmission are processing functions of the image forming apparatus accompanied by data writing or reading utilizing the document storage unit 307. These processing functions divide a memory in the document storage unit 307 by job or user, for temporary data storage, and perform data input/output using combinations of user IDs or passwords.

Further, the operation unit 313, for selecting various flows as above and for issuance of operation instructions, is also used for preview of image data in the document storage unit 307 in accordance with improvement in high resolution display unit of the operation unit 313. When checked image data is OK, print output can be performed.

[Profile Internal Structure]

Next, the finisher profile stored in the profile storage area 23 of the client PC 11 will be described.

In the present embodiment, the respective devices including the image forming apparatus and the finishers have profile information describing their abilities in the XML format. There are various finisher types such as a bookbinder, a cutting machine and a folding machine, and the functions are much different in accordance with finisher type. Further, the information changes very often by addition of new function or the like. Accordingly, in the present embodiment, the XML format having tag description which can appropriately used in such situation is employed as the finisher profile. Note that any description format can be used without any problem as long as a newly-added function or the like can be adaptively described. Further, the finisher profile is prepared by finisher.

FIG. 4 is an example of the description of the finisher profile of a bookbinder. FIG. 5 is an example of the description of the finisher profile of a cutting machine. In these figures, "FinishingType" represents the type of finisher such as a bookbinder or cutting machine; "Manufacturer", the name of a maker manufactured the finisher; and "ProductName", the model of the finisher. Accordingly, FIG. 4 represents a "model 11ABC bookbinder manufactured by ABC company (type: Bookbinding)". Further, FIG. 5 represents a "model 10XYZ cutting machine manufactured by XYZ company (Type: Cutting)". Note that tags <Booklet> in FIG. 4 and <Cutting> in FIG. 5 describe abilities specific to the bookbinder and the cutting machine. In this manner, the functions specific to the respective finishers are respectively defined as tags, thereby a profile description can be realized. The profile information is stored in, e.g., a storage device of the finisher, and read and collected by the image forming apparatus, otherwise, directly collected from the finisher by control of a printer driver of a information processing apparatus as a host computer.

[Finisher Profile Management]

Figure 6:
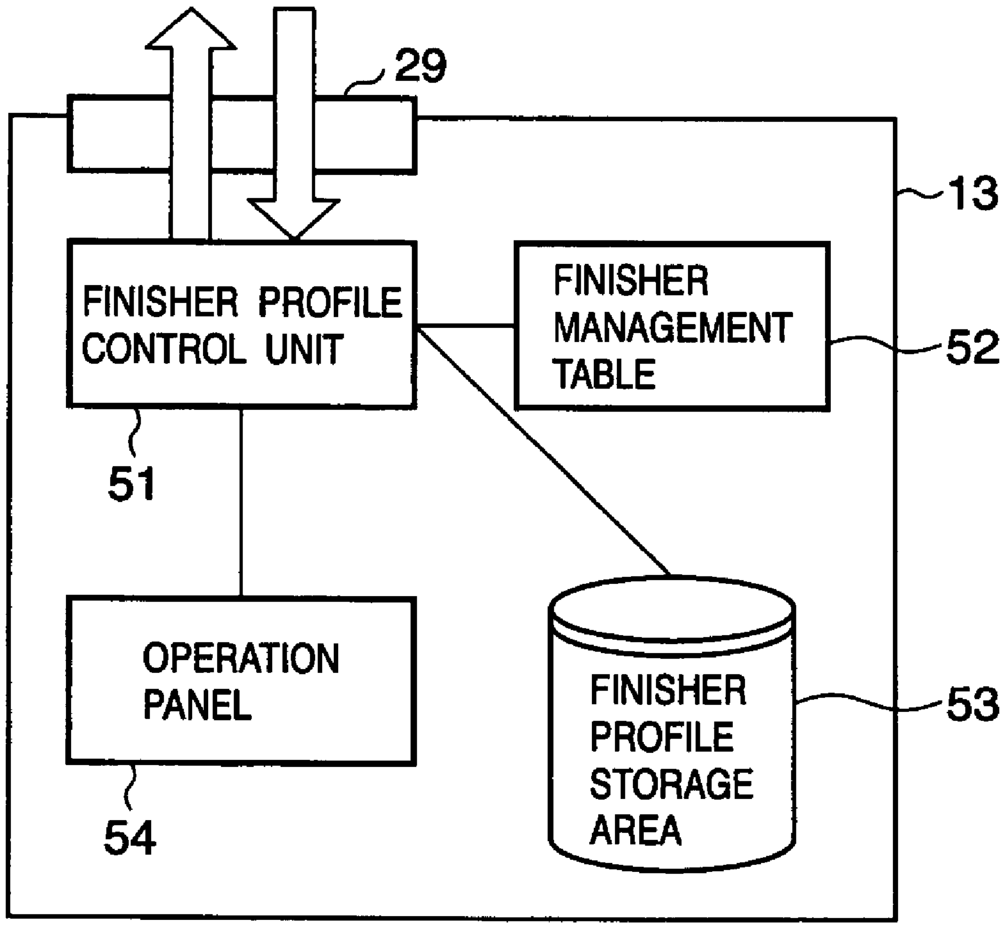
FIG. 6 is a block diagram showing modules related to the finisher profile of the image forming apparatus 13.

FIG. 6 is a block diagram showing modules related to the finisher profile of the image forming apparatus 13. As described in FIG. 2, the image forming apparatus 13 has the communication I/F 29 for communication with the outside. A finisher profile control unit 51 performs transmission of a finisher profile in response to a finisher profile acquisition request from the outside. A finisher management table 52 is a table for managing finisher names, corresponding finisher profile names, connection statuses and the like (to be described later in FIG. 7). A finisher profile storage area 53 holds the substance of the finisher profile as described in FIGS. 4 and 5. Note that finishers connectable to the image forming apparatus 13 are previously registered. Information of finisher name and the like are stored in a finisher management table 13, and profiles corresponding to these finishers are stored in the finisher profile storage area 53. The finishers connectable to the image forming apparatus 13 include an in-line finisher and a near-line finisher.

Figure 19:
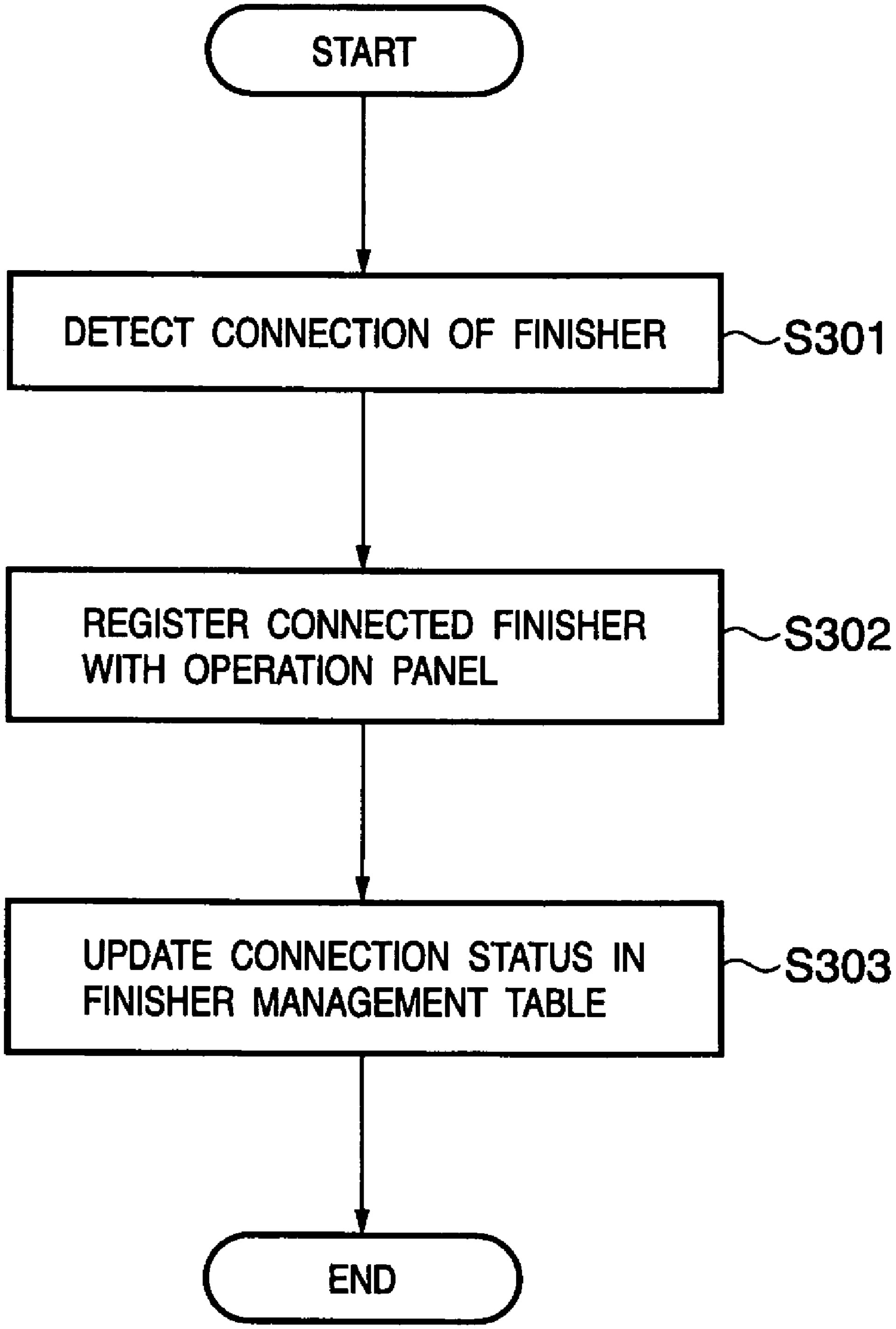
FIG. 19 is a flowchart showing a procedure for registering a finisher in the image forming apparatus.

FIG. 7 is a table showing the data structure of the finisher management table 52. Information on the finishers connectable to the image forming apparatus 13 is previously stored in the finisher management table 52. The finisher management table 52 according to the present embodiment has, as data items, a management number 101 (variable type is Unsigned Short), a finisher 102 (variable type is String), a manufacture 103 (variable type is String), a corresponding profile 104 (variable type is String), and a finisher connection status 105 (variable type is Boolean: "false" means unconnected status while "true" means connected status). For example, in a column where the management number 101 is "#5", the finisher name 102 is "Finisher-X", the manufacturer 103 is "XYZ", and the corresponding profile name 104 is "finisher-x-of-xyz.XML". Further, the connection status 105 "true" means that the finisher is connected. In the other columns, similar interpretation can be made. Note that in the table of FIG. 7, the other finishers than the management number "#5" finisher are unconnected. In the present embodiment, the Finisher-X corresponds to the in-line finisher 15. Further, update processing of the finisher management table 52 corresponding to connection of a near-line finisher or the like to the network will be described with reference to a second embodiment (FIG. 19).

<Acquisition of Finisher Profile>

Next, a procedure for acquisition of finisher profile of a near-line finisher from the image forming apparatus by the printer driver and storage of the acquired profile will be described.

Figure 8:
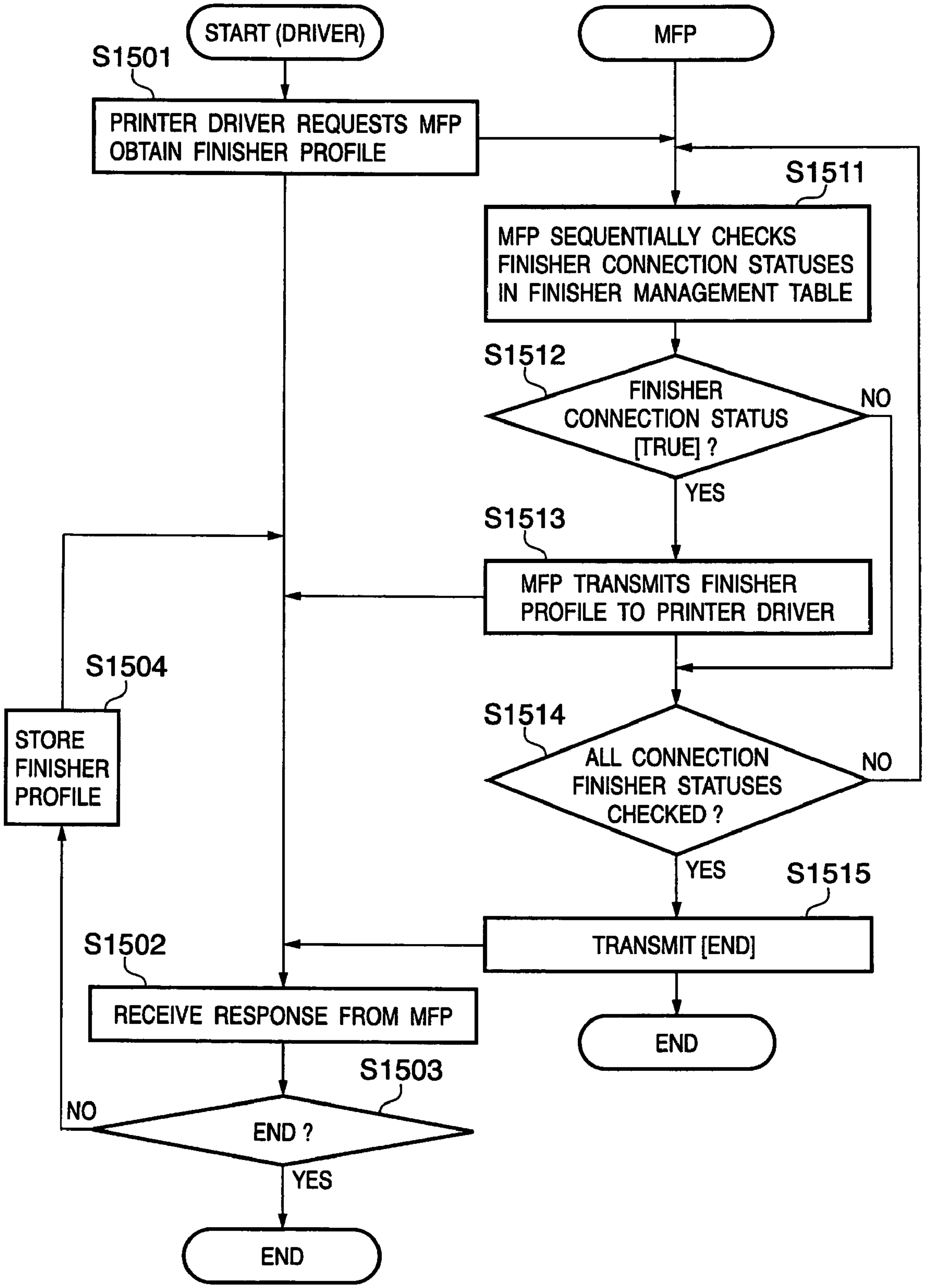
FIG. 8 is a flowchart showing a finisher profile acquisition method.

In the construction of FIG. 2, the profile storage area 23 is a storage area in the OS to store a finisher profile obtained by the printer driver 24 from the image forming apparatus 13. The printer driver 24 starts a profile acquisition module through the API (Application Programming Interface) of the OS, then obtains a finisher profile from the image forming apparatus using the profile acquisition module, and stores the profile into the profile storage area 23. The profile acquisition module may be a module as a part of the printer driver 24, or may be provided as a part of the functions of the OS 21. Further, to make a finisher profile request or perform transmission of finished profile, a communication medium is used between the communication I/F 28 on the client PC side and the communication I/F 29 on the image forming apparatus side. Note that any protocol can be used in the communication as long as a finisher profile acquisition request can be made from the printer driver and transmission of the substance of finisher profile can be performed, and there is no designation of protocol. Next, a method for acquisition of a finisher profile from the image forming apparatus by the printer driver will be described with reference to a flowchart. FIG. 8 is a flowchart showing this procedure. The processing in FIG. 8 is performed when the power of the computer is turned on, when a print processing instruction is made by the user, or performed in accordance with the user's explicit instruction.

First, at step S1501, the printer driver 24 requests the image forming apparatus 13 obtain a finisher profile of a finisher which is connected to and registered in the image forming apparatus. In response to the acquisition request from the printer driver, the image forming apparatus 13 transmits a finisher profile stored in the finisher profile storage area 53 to the client PC 11 where the printer driver operates.

First, at step S1511, the image forming apparatus which has received the request (MFP in FIG. 8) sequentially browses the finisher management table from the top, and thereby checks connection statuses of the respective finishers. For example, when the image forming apparatus has the finisher management table 52 shown in FIG. 7, the image forming apparatus 13 checks the connection status of the top "Finisher-A" at the first step. In this table, the finisher connection status is "false" meaning that the finisher is not available. Next, at step S1512, the connection status condition is determined. As the "Finisher-A" is in the "false" connection status, the process proceeds to step S1514. At step S1505, it is determined whether or not all the finishers have been checked. If all the finishers have not checked, the process returns to step S1511. This processing is similarly repeated for "Finisher-B", "Finisher-C" and "Binder-ABC".

Next, at step S1511, the connection status of the next entry "Finisher-X" is checked. As the connection status of the "Finisher-X" is "true" meaning that the finisher is available, in the condition determination at the next step S1512, the process proceeds to step S1513. At step S1513, the image forming apparatus transmits the finisher profile of each finisher managed in an available status (i.e., the finisher currently-checked on the finisher management table) to the printer driver. For this purpose, the image forming apparatus reads a corresponding finisher profile name "finisher-x-of-xyz.xml" from the finisher management table 52. Then the image forming apparatus reads a file with this file name from the finisher profile storage area 53 and transmits the file to the printer driver (step S1513).

The processing at the above steps S1511 to S1513 is repeated on all the finishers registered in the finisher management table 52. When the last finisher in the finisher management table has been checked, information indicating the completion of all the finishers is transmitted to the printer driver at step S1515, and the processing of the flowchart ends.

On the other hand, the printer driver receives a response from the image forming apparatus (step S1502), to determine whether or not the content of the response is "end" (step S1503). When the response is not "end", as the received data is a finisher profile, the printer driver stores the data in the storage area (step S1504). In this manner, the printer driver obtains a finisher profile of a near-line finisher in a connected status (i.e., available status) from the image forming apparatus.

Note that a profile of an in-line finisher can be obtained as in the case of the near-line finisher. Further, regarding the in-line finisher, as the number of in-line finishers connectable to the image forming apparatus is limited, it may be arranged such that the profiles of all the in-line finishers are previously stored in the image forming apparatus. In this case, an activation flag or the like is associated with the profile of a near-line finisher actually connected to the image forming apparatus, thereby the connection status is indicated. Accordingly, upon processing for finisher setting or the like, an activated in-line finisher is an available finisher.

Note that in the present embodiment, as the profiles of the near-line finishers are consolidately managed by the image forming apparatus 13, all necessary finisher profiles can be acquired from the image forming apparatus 13, however, the present invention is not limited to this arrangement. For example, it may be arranged such that the printer driver 24 directly access a near-line finisher to obtain a finisher profile. In this case, it is necessary for the printer driver 24 to obtain the address of the near-line finisher on the network 16, however, such address acquisition or the like is apparent for those skilled in the art. Further, in the above description, the printer driver obtains a finisher profile, however, the present invention is not limited to this arrangement. A print setting application 27*a* or another acquisition unit may be employed to obtain a finisher profile.

The acquisition of finisher profile from the image forming apparatus 13 and the acquisition of finisher profile from a near-line finisher realized by the communication function of the printer driver 24 are described as above. The acquisition of finisher profile may be performed at arbitrary timing by e.g., polling, or may be performed upon e.g., wizard generation to be described below. Further, it may be arranged such that near-line finisher and off-line finisher may be manually registered. Note that as described above, in a case where the profiles of all the finishers (in-line finishers, near-line finishers and off-line finishers) available for the image forming apparatus 13 can be registered in the finisher management table 52, the printer driver 24 can obtain all the finisher profiles in the printing system from the image forming apparatus. Further, it may be arranged such that profiles of in-line finishers are notified from the image forming apparatus 13 to the printer driver 24 without management by the finisher management table 52 (in this case, the in-line finishers are not registered in the finisher management table 52).

[Generation of Function Table]

The print setting application 27*a* held on the client PC 11 generates a print setting wizard for the user to instruct print settings. The print setting wizard is generated based on the finisher profiles stored in the profile storage area 23 and the ability information of the image forming apparatuses held in the respective printer drivers. Note that in the present embodiment, the wizard is called the "print setting wizard", however, the wizard can be used upon setting for performing postprocessing such as bookbinding finishing on printed sheets using the respective finishers.

Note that the wizard means a function and its display screen to display an interactive guidance for a user and cause the user to make a selection among plural options in accordance with guidance thereby facilitate complicated software operation or setting. For example, a wizard screen upon installation of application software into a computer which sequentially displays installed functions and installation-destination directories is well known.

The print setting application 27*a* first collects the finisher profiles and ability information of the image forming apparatuses, and analyzes the contents of the profiles by function. Then the print setting application 27*a* generates function tables having information in function units such as print function, bookbinding function and cutting function. In the present embodiment, processing stages are classified into "print stage" and "postprocessing stage".

Figure 9A:
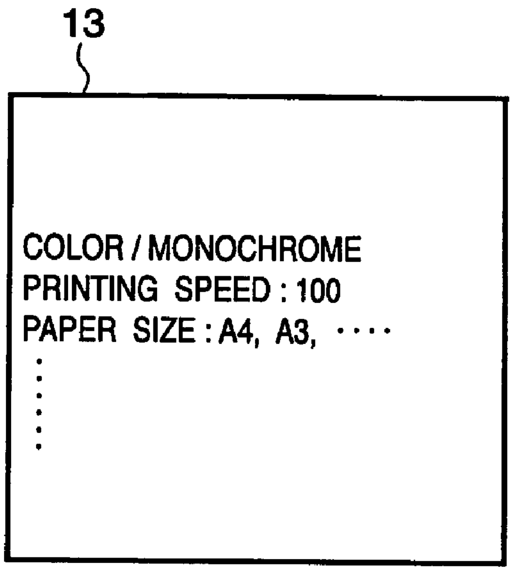
FIGS. 9A and 9B schematically show ability information of the image forming apparatus 13 and that of an in-line finisher 13*a* among profiles of respective devices obtained by a printer driver 24.
Figure 9B:
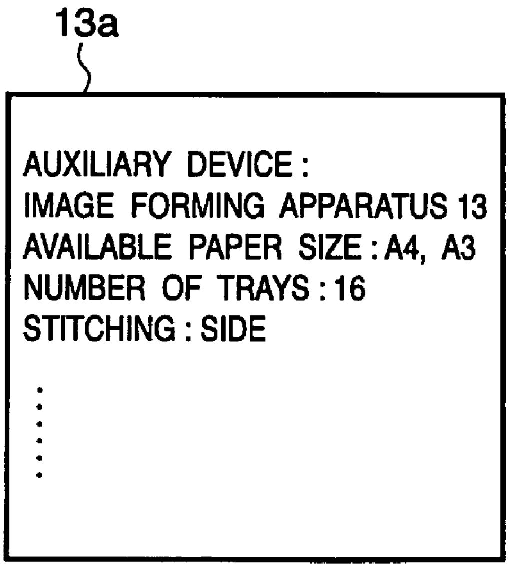
Figure 10:
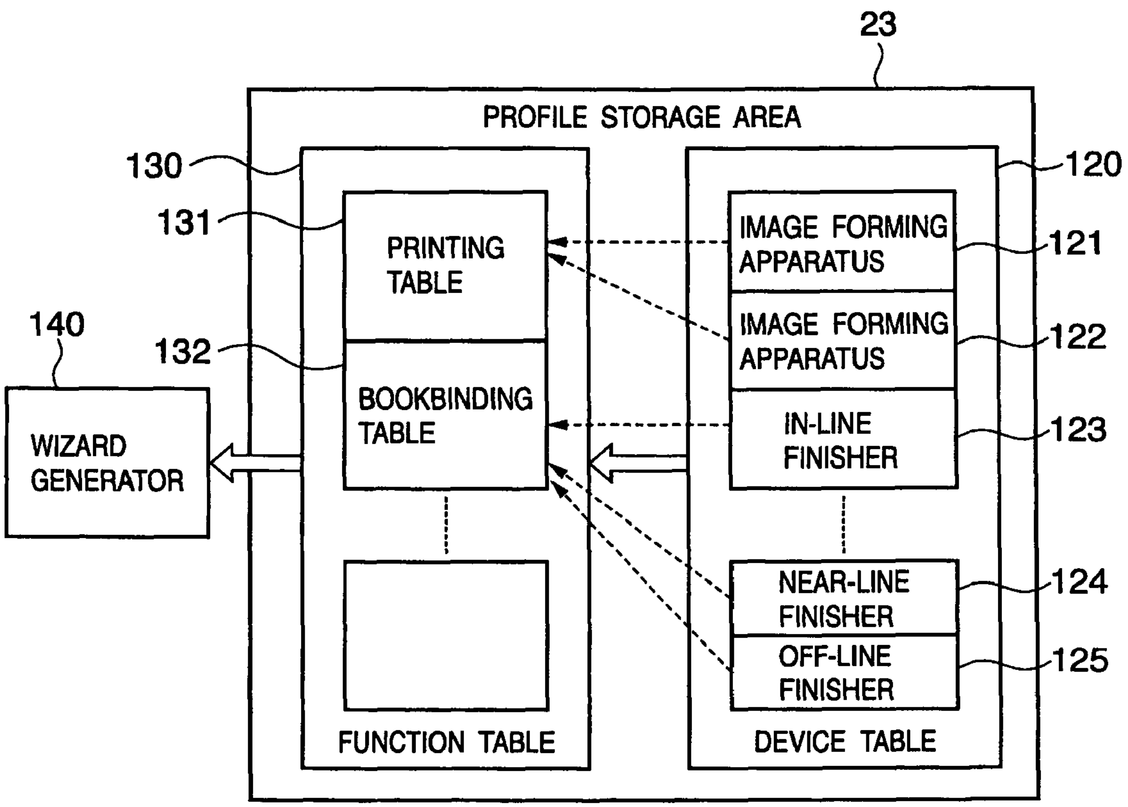
FIG. 10 is an explanatory diagram showing table generation by a print setting application 27*a;*

FIGS. 9A and 9B schematically illustrate the ability and function information of the image forming apparatus 13 and the in-line finisher 13*a* among the ability and function information obtained by the printer driver 24. Note that the "function" here means executable processing such as print processing or stitching processing, while the "ability" means the specifications of the function such as a printing speed and the number of sheets to be stitched. However, in the following description, for the sake of simplification of explanation, the ability and function information may be simply described as ability information. Actually, the information is described in the XML format as described in FIG. 4 or 5. Further, FIG. 10 is an explanatory diagram showing table generation by the print setting application 27*a*. Note that regarding the image forming apparatus and an in-line finisher attached to the image forming apparatus, as the abilities and functions of these devices can be grasped upon printer driver designing, the information is not necessarily described in the above-described XML format.

In the present embodiment, the image forming apparatus 13 (FIG. 9A) is a color machine (also available as a monochrome machine), having a print speed of 100 sheets/minute, and an available paper size of A4 and A3. Further, the in-line finisher 13*a* is connected to the image forming apparatus 13, and as its abilities (FIG. 9B), the available paper size is A4 and A3, the number of placeable sheets is 16, and the binding method is side stitching. The print setting application 27*a* generates a device table 120 where these ability information are registered by device.

Next, the print setting application 27*a* generates a function table 130 from the device table 120. For example, the print setting application 27*a* classifies the processings in the printing system into plural processing stages such as print processing and print postprocessing, collects the ability information by processing stage function (print function or bookbinding function), and generates the function table 130. For example, the print setting application 27*a* collects the ability information of the respective image forming apparatuses (ability information 121 of the image forming apparatus 13 and ability information 122 of the image forming apparatus 14) and generates a printing table 131 where the print functions are collected. Further, the print setting application 27*a* collects the ability information of the respective finishers (ability information 124 of the in-line finisher 13*a*, ability information 125 of the near-line finisher 15, and ability information 125 of an off-line finisher (not shown)) and generates a bookbinding table 132 where the bookbinding functions are collected. FIGS. 11A and 11B show the data structure of the function table (printing table (FIG. 11A) and bookbinding table (FIG. 11B)) in the present embodiment.

[Generation of Wizard Screen by Wizard Generator]

The print setting application 27*a* has a wizard generator 140 (FIG. 10) to read the above-described function table 130 and construct the print setting wizard. The wizard generator 140 refers to the function table 130 and generates a wizard screen to be used upon print setting processing to be described later. As shown in FIGS. 11A and 11B, the function table 130 includes a bookbinding table 132 where finisher functions are collected, with a printing table 131 where image forming functions are collected. The wizard generator is an application to generate a wizard screen to be displayed on a display, and a control program where interscreen transition condition or the like is described.

Figure 12:
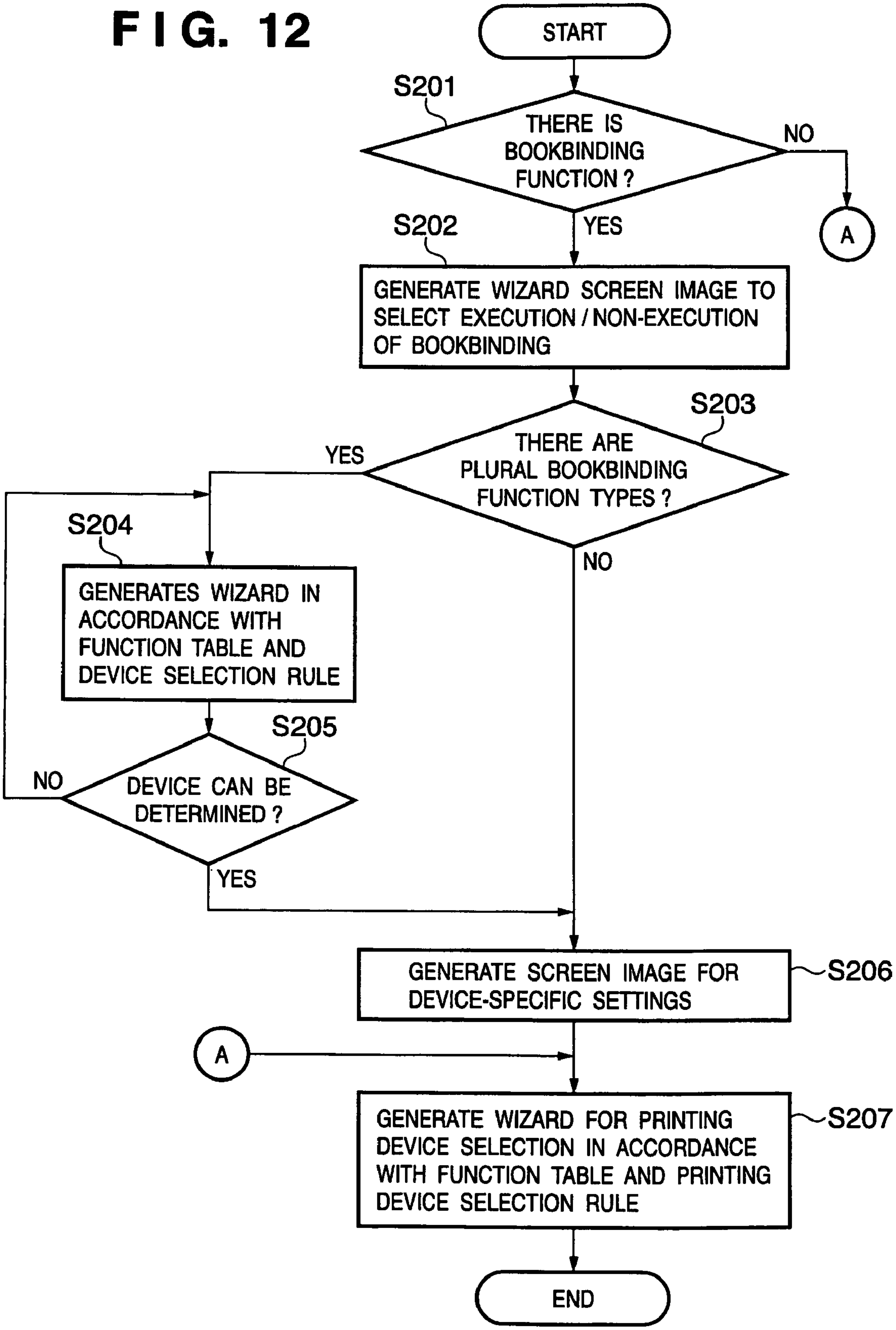
FIG. 12 is a flowchart showing wizard screen generation processing by a wizard generator.

FIG. 12 is a flowchart showing selection and setting of bookbinding device by a wizard. Note that in FIG. 12, wizard screen generation is started by referring to the bookbinding table corresponding to the bookbinding processing as the final processing form, i.e., the final stage for generation of a bookbound product, in the function table.

Figure 13:
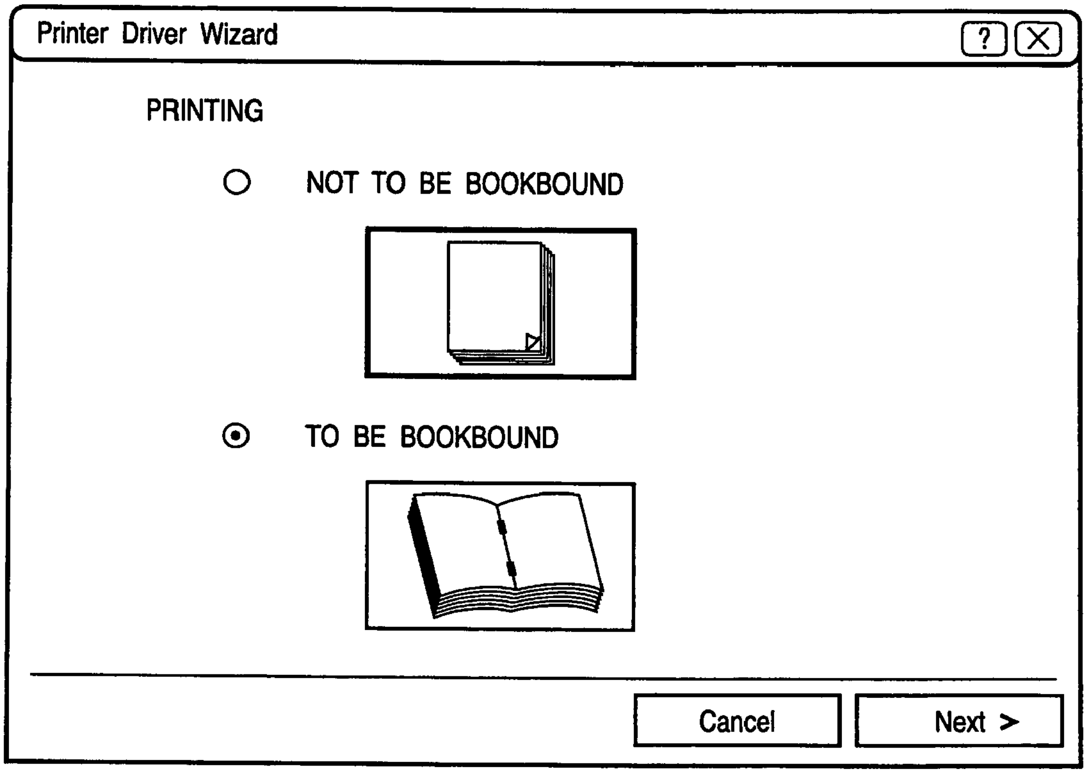
FIG. 13 is an example of a wizard screen for inquiry about execution/non-execution of bookbinding.

At step S201, the wizard generator 140 determines whether or not a bookbinding table exists in the function table 130. When a bookbinding table exists, the process proceeds to step S202, at which a wizard screen is generated for inquiry about execution/non-execution of bookbinding. FIG. 13 is an example of the wizard screen.

Next, at step S203, the wizard generator 140 determines whether or not plural bookbinding types exist in the bookbinding table 132. When there are plural bookbinding types, it is impossible merely based on the designation "TO BE BOOKBOUND" in the wizard screen generated at step S202 to determine a bookbinding type and a finisher to be used.

Accordingly, at step S203, when there are plural bookbinding types, the process proceeds to step S204. Then a wizard screen for selection of bookbinding type is generated at step S204.

Next, the determination at step S203 and the generation of the wizard screen at step S204 will be described more specifically. At step S203, the contents of "stitching function" in the bookbinding table 132 are referred to, and it is determined whether or not plural stitching functions exist in the "stitching function". In the "stitching function" of the bookbinding table 132 shown in FIG. 11, it is found that the in-line finisher 13*a* has a function of side stitching, and the near-line finisher 15 has the function of side stitching and a function of saddle stitching. That is, as a bookbound product by side stitching and that by saddle stitching as the bookbinding forms can be produced, a selection is to be made from plural bookbinding types.

Figure 14:
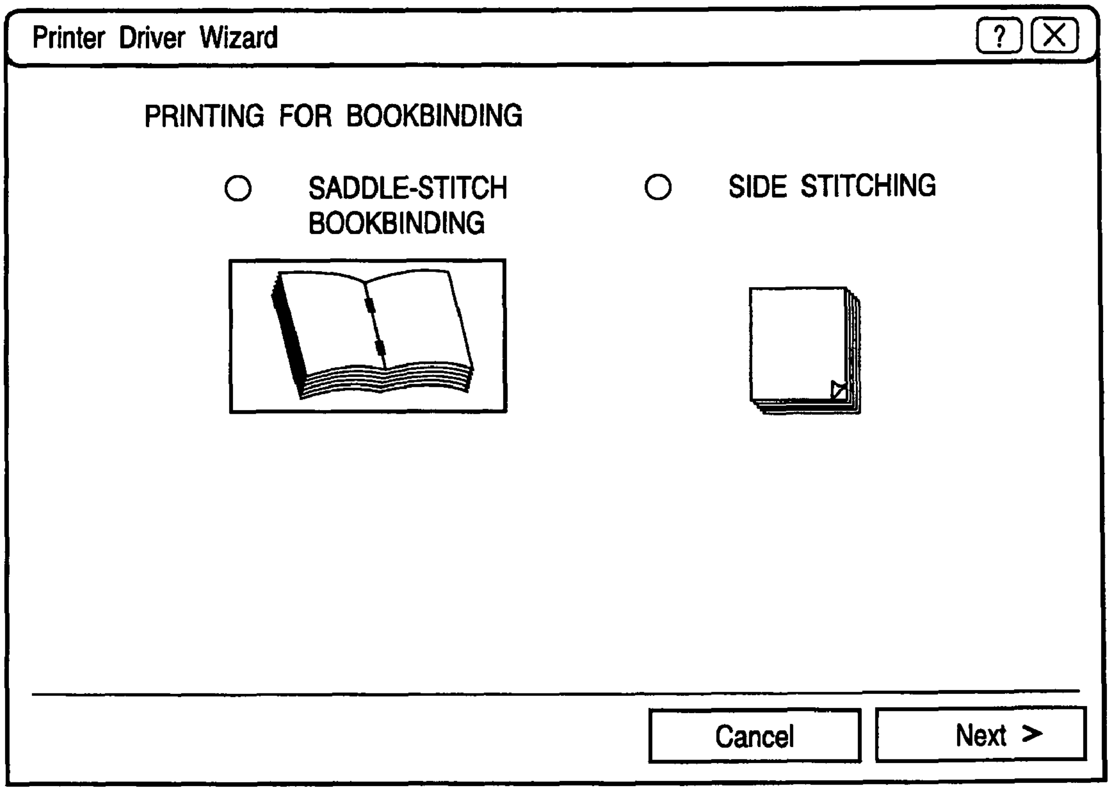
FIG. 14 is an example of a wizard screen for inquiry about selection of stitching function.

In this manner, when it is determined at step S203 that plural bookbinding types (bookbinding forms) exist, the process proceeds to step S204. At step S204, a bookbinding type selection wizard screen is generated for the user to select one of the plural bookbinding types determined at step S203. In this example, as the two bookbinding types, side stitching and saddle stitching exist, a screen to select one of them is generated. FIG. 14 shows the wizard screen at this time.

At step S205, if a single finisher has been determined as a result of the selection of function type in the wizard screen in FIG. 14, the device is set, and the process proceeds from step S206 to step S207. That is, in a case where a finisher corresponding to the selected bookbinding type, selected from the plural bookbinding types displayed in the bookbinding type selection wizard screen generated at step S204, the finisher to execute the user's desired bookbinding processing is determined at this stage.

On the other hand, when the wizard generator 140 determines at step S205 that a device (finisher) to be used cannot be determined only by selecting one bookbinding type, the process returns from step S205 to step S204. Then, the wizard generator 140 generates a wizard screen for determination of a device to be used in accordance with a finishing device selection rule to be described later.

Next, there will be described a particular example of a case where a device (finisher) to be used cannot be determined only by selecting one bookbinding type. For example, when the bookbinding table 132 is referred to and "side stitching" is selected as a function type, this function can be realized by the in-line finisher 13*a* and the near-line finisher 15. Accordingly, the device to be used cannot be determined at this stage. In the present embodiment, a wizard in accordance with the finishing device selection rule is generated at step S205.

Further, in a case where only one type of stitching function exists, the stitching function is set. When a finishing device cannot be determined at this stage (for example, there are plural finishers having the same side stitching function), a wizard screen is generated in accordance with the finishing device selection rule to be described later. Note that at this time, it may be arranged such that the existing stitching function is indicated and at the same time a screen notifying that there is no choice of stitching function is generated.

Hereinbelow, the finishing device (finisher) selection rule will be described with reference to the function tables in FIGS. 11A and 11B. Note that the selection rule is merely an example and it does not pose any limitation on the present invention.

(Example of Finishing Device Selection Rule)

In a case where plural bookbinding devices exist in the bookbinding table 132, the functions of the respective devices are compared with each other in accordance with the order of predetermined inquiries. Then regarding devices having different contents of function information, a screen for inquiry about selection of function is generated. In the example of the bookbinding table in FIG. 11B, two types of devices i.e., the in-line finisher 13*a* and the near-line finisher 15 exist. In this case, for example, function comparisons are made in the order "stitching function"→"available paper size"→"number of sheets" . . . , and a wizard is generated only regarding different function information. Hereinbelow, the generation of wizard will be described more specifically. Note that in this example of finishing device selection rule, the processing at step S204 will be described.

(1) First, the stitching functions are compared with each other, and a wizard for selection of side stitching or saddle stitching (FIG. 14) is generated. When the user has selected the saddle stitching function through this wizard screen, the near-line finisher is specified as a finishing device to be used. Accordingly, as a screen changed from this screen, a screen for setting specific to the near-line finisher is generated, and the setting is made.

(2) In a case where the side stitching function has been selected, a finishing device cannot be determined. Accordingly, "available paper size" of both devices are compared with each other. According to the information stored in the bookbinding table 132 in FIG. 11B, as the specification of the "available paper size" is the same in both devices, a wizard is not generated. Note that when the specification of "available paper size" of the in-line finisher is different from that of the near-line finisher, a wizard for selection of paper size is generated.

Figure 15:
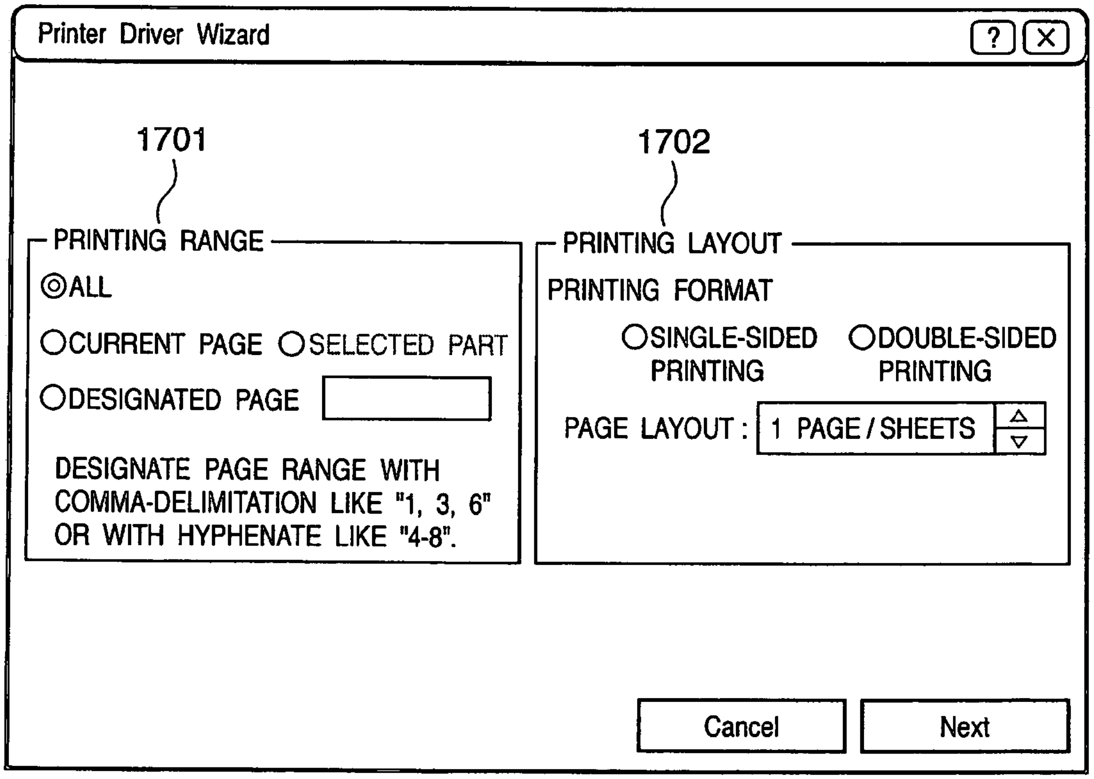
FIG. 15 is an example of a wizard screen for inquiry about printing range (number of pages) and printing layout.

(3) When a device to be used has not been determined in (2), "number of sheets (upper limit number of stitchable (or bindable) sheets)" of both devices are compared with each other. In the example of the bookbinding table 132 in FIG. 11B, as the "number of sheets" of the in-line finisher is different from that of the near-line finisher, a wizard for inquiry about a printing range (number of pages) and a printing layout is generated. FIG. 15 shows an example of this wizard screen. In a printing range 1701, setting can be made as to whether all the pages of print subject document of designated page(s) is to be print-outputted, and the like. In a printing layout 1702, the layout of page data with respect to a print sheet is set. In FIG. 15, the layout selection is made by pull-down selection. Then, the number of sheets to be stitched is calculated from the setting, and when the number of sheets is more than 16, the near-line finisher 15 is determined as a device to be used. However, when the number of sheets is equal to or less than 16, a wizard for inquiry of another function is generated. Note that the number of pages of print subject document may be obtained upon execution of printing by referring to document data by wizard plug-in. Further, the number of pages may be obtained from an application which has generated the document data.

(4) In a case where a device has not been specified even when all the items of inquiry have been processed, priority is given to an in-line finisher. If a device has not been determined yet, determination is made in accordance with a predetermined selection rule of e.g., the order of device registration, the order of names, or processing speed. At this time, the user may set the selection rule using, e.g., processing-speed priority. Otherwise, a finisher which has become the last one may be displayed so as to be selected by the user.

By the processing at step S204 based on the above-described finishing device selection rule, when it is determined at step S205 that a finisher corresponding to the bookbinding type can be determined, the process proceeds to step S206. At step S206, a wizard screen for setting necessary setting conditions (stitching position, paper size, the number of sheets etc.) for use of the finisher corresponding to the bookbinding type is generated. This wizard screen may be a screen displaying all the setting items processible by each finisher, or may be a wizard screen group for stepwisely setting the respective items. For example, in a screen regarding the in-line finisher 13*a*, various setting items including a stitching direction (long-side stitching or short-side stitching) and stitching position may be displayed in one screen. Otherwise, a screen for selection of stitching direction is generated first, then a screen for selection of stitching position is generated as a screen to be displayed next.

Note that in the above example, plural finishers having stitching functions exist, however, the finishers include a cutting machine to cut paper or the like. For example, when a cutting machine exists, a wizard screen is generated in accordance with "whether or not cutting function exists" from step S201 in the flowchart of FIG. 12. Then, a transition condition between a wizard screen regarding the bookbinding function and a wizard screen regarding the cutting function is determined. That is, when the user has selected "Not to be bound" in the wizard screen in FIG. 13, linkage is made such that the screen changes to a wizard screen for selecting "To be cut" or "Not to be cut" as a wizard screen regarding the cutting function. Further, when the user has selected "To be bookbound" in the wizard screen in FIG. 13, linkage is made such that setting for the above-described bookbinding is made, then the screen changes to a wizard screen for selecting "To be cut" or "Not to be cut". When the user has selected "To be bookbound" and the content of set bookbinding has not correspond with the ability of the cutting machine, a wizard regarding the cutting is not displayed, otherwise, a screen notifying the user that the cutting function cannot be utilized is generated, and linkage is made such that the screen is displayed when such setting has been made. For example, when the paper type determined by the user in a wizard screen regarding bookbinding is not an available paper type for the cutting machine, even if a wizard screen for inquiry about use of cutting function has been prepared, the screen is not displayed. Otherwise, a transition condition is previously determined such that a screen notifying "paper type determined in bookbinding setting is not available for cutting function" is displayed.

By the above processing, the generation of wizard screen group for the purpose of setting of bookbinding and other postprocessing has been completed. Next, the processing changes to generation of wizard screen group for the purpose of print setting.

At step S207, generation of a wizard screen for determining a printing device is performed. In this example, the generation processing will be described using a printing device selection rule.

(Printing Device Selection Rule)

When plural printing devices exist in one printing table, the functions of the respective devices are compared with each other in accordance with a predetermined order. Then a wizard screen for inquiry about selection of function is generated regarding different function information. In the present embodiment, the functions and abilities are compared in the order "color selection" "available paper size" "printing speed" . . . , and a wizard is generated regarding different information. Hereinbelow, a particular procedure will be described using the printing table 131 in FIG. 11A.

Figure 16:
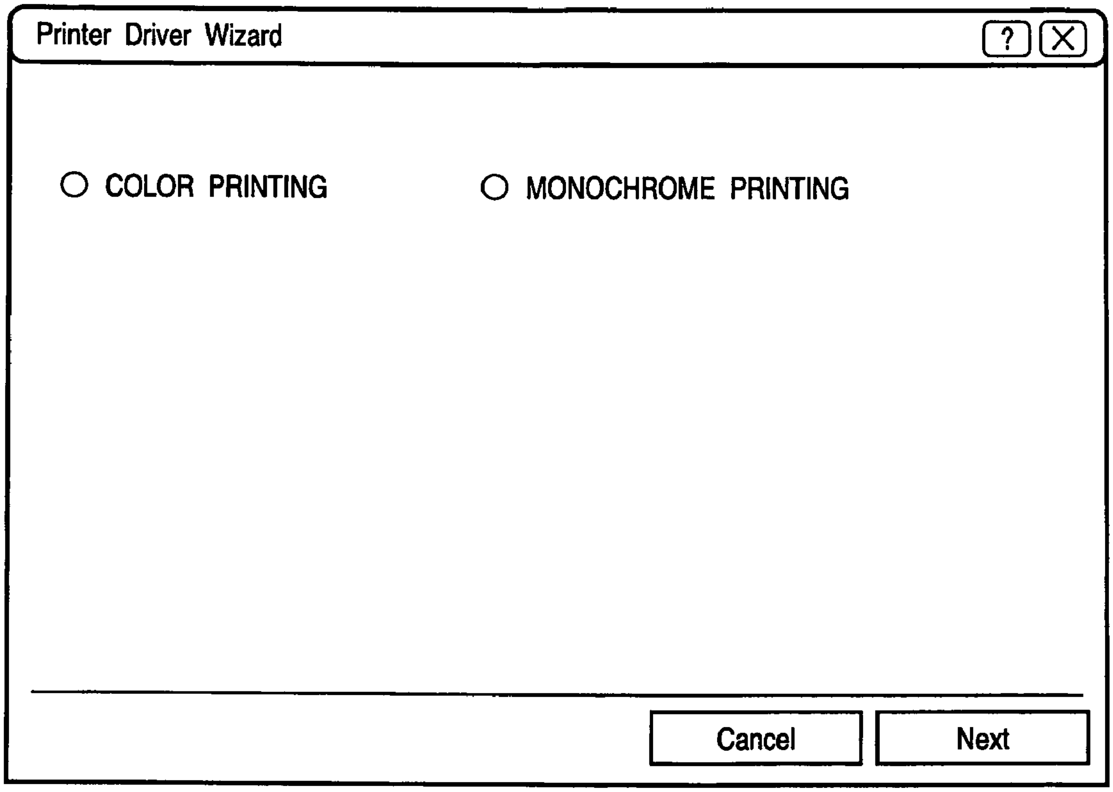
FIG. 16 is an example of a wizard screen for selection of color/monochrome output.

(1) The "color selection" functions are compared with each other, and a wizard for selecting color/monochrome output as shown in FIG. 16 is generated.

(2) A screen to change processing in accordance with an item selected in the screen generated in (1) is generated.

Figure 17:
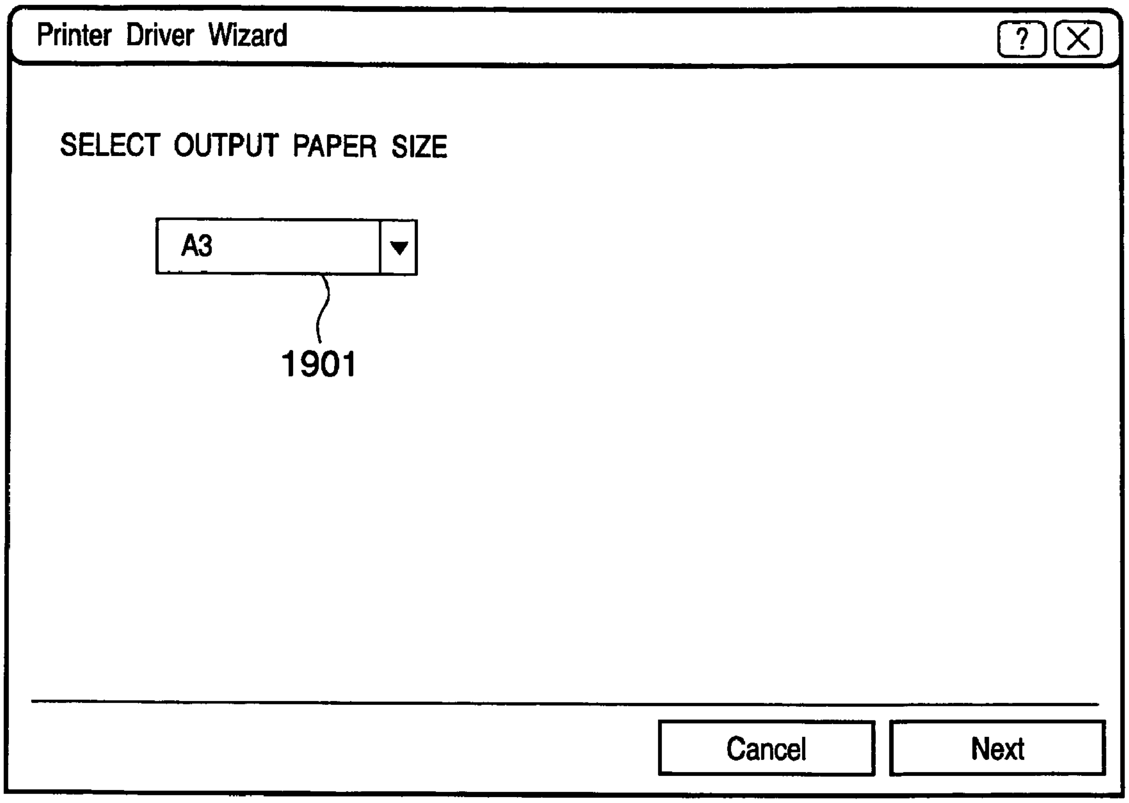
FIG. 17 is an example of a wizard screen for selection of output paper.

When color output has been selected in (1), as only the image forming apparatus 13 is capable of color printing, the image forming apparatus 13 is selected in the change screen. Accordingly, a screen, not for specifying a printing device, but for making various settings specific to the image forming apparatus 13, is generated. When monochrome printing has been selected, as an image forming apparatus cannot be specified, the wizard generator 140 generates a wizard screen corresponding to the "available paper size". In this case, a wizard screen (FIG. 17) for selecting output paper is generated. In this example, a paper selection screen by pull-down selection (1901) is shown. When "A3" size has been selected, the image forming apparatus 14 incapable of A3-size output is excluded, and the image forming apparatus 13 is selected as a printing device. However, when "A4" size has been selected, a printing device cannot be specified.

(3) When one printing device (image forming apparatus) has not been specified in (2), a routine to determine whether or not the finishing device determined using the above-described wizard for specifying a bookbinding device is an in-line finisher is provided. Then, when it is determined that the finishing device is an in-line finisher, if a printing device connected to the in-line finisher is included in the candidates upon completion of the determination in (2), the printing device is selected. As a result, at a process of actual print setting by the user using the wizard, a printing device is selected when the following conditions are satisfied.

The finishing device determined in the processing prior to the processing for specifying a printing device is an in-line finisher.

The printing device connected to the in-line finisher is included in the candidates in the completion of the determination in (2).

(4) When a printing device has not been determined in (3), a printing device is determined from plural printing devices in accordance with a predetermined selection rule such as a predetermined priority order or output speed. A printing device is not determined by (3) in the following cases.

The finishing device is not an in-line finisher, or

The printing device as a candidate after (2) is not connected to the in-line finisher determined in the finishing device selection.

Note that it may be arranged such that the user's preference (speed priority/running cost priority or the like) is set. Otherwise, it may be arranged such that a screen to display a printing device which has become the last one is generated to cause the user to select the displayed device.

(5) Finally, a screen for device-specific setting is generated.

Then, the wizard screen generation processing ends.

The print setting wizard generation processing by the wizard generator 140 is as described above. Note that the wizard generated by the wizard generator 140 is stored as a print setting application in the host computer in FIG. 2. Further, the screen group and the transition conditions among the screens are also stored.

[Print Setting Processing Using Wizard]

Next, print setting using the wizard generated in the above-described procedure will be described. The user starts a "print setting wizard" stored as an application. Then, the user causes the print setting wizard to recognize document data (e.g., a PDF file) that the user wants to print output. This processing is performed by the user's causing the wizard to display a reference screen for designation of a file and designating a data path of the document data. When a file has been specified, the screen shown in FIG. 13 is displayed on the screen of the client PC.

Then, the user changes the screen while inputting desired contents through the displayed screen, thereby a finishing device and a printing device are automatically determined.

Note that the setting information inputted through the wizard is stored by the OS in a temporary storage area owned by the wizard (print setting application). When a printing device has been determined, the print setting application stores the setting information stored in the storage area of the print setting application into the printer driver setting storage area 22 corresponding to the printing device. Thus, a status similar to that upon print setting via a general printer driver can be obtained.

In the above-described wizard, when all the setting has been completed, a screen for the user's designating "whether or not printing is to be started" is displayed. When printing is to be started in this screen, the user input designation of "start printing".

When start of printing has been designated, the print setting application starts the printer driver of the printing device to be utilized. The printer driver receives the document data designated through the wizard using the print setting stored in the printer driver setting storage area 22.

Hereinbelow, a print job including the print subject data that reflects the print setting and commands for execution of instructions and controls for the device is generated.

The print job generated by the printer driver is transmitted via the network to the printing device, and printing is performed on the set printing condition.

Note that in the case of print setting using a near-line finisher, the setting information is notified to the near-line finisher. The notification of the setting information to the near-line finisher is made as notification of job control information describing the contents of postprocessing. The job control information, which is also referred to as a "job ticket", has a description in structured language interpretable for the near-line finisher. The job ticket generated by the printer driver is transmitted via the image forming apparatus or directly, to the near-line finisher. The near-line finisher receives the job ticket and interprets the job control information, thereby setting necessary for postprocessing of printed matter outputted from the image forming apparatus can be automatically performed. Note that in the present invention, any method can be used in the generation of the print job, and transmission of the print job from the printer driver to the image forming apparatus, the in-line finisher or the near-line finisher, and any data format of the print job can be used.

Note that in the above processing, the generation of the wizard is previously performed, and when the user performs printing, the user interactively sets the conditions from a final product using the wizard, thereby easily performs print setting and postprocessing device setting. However, it may be arranged such that a wizard screen is generated upon display of the wizard.

As described above, according to the first embodiment, the print setting wizard is generated for interactive input of necessary items from the user's desired final product, and the setting regarding printing and postprocessing is performed using the wizard, thereby the selection and setting of an image forming apparatus to obtain the desired final product and other necessary device can be easily performed.

Second Embodiment

Hereinbelow, the operation of the wizard generator 140 when a near-line finisher has been newly added to the construction of the first embodiment will be described as a second embodiment.

Figure 18:
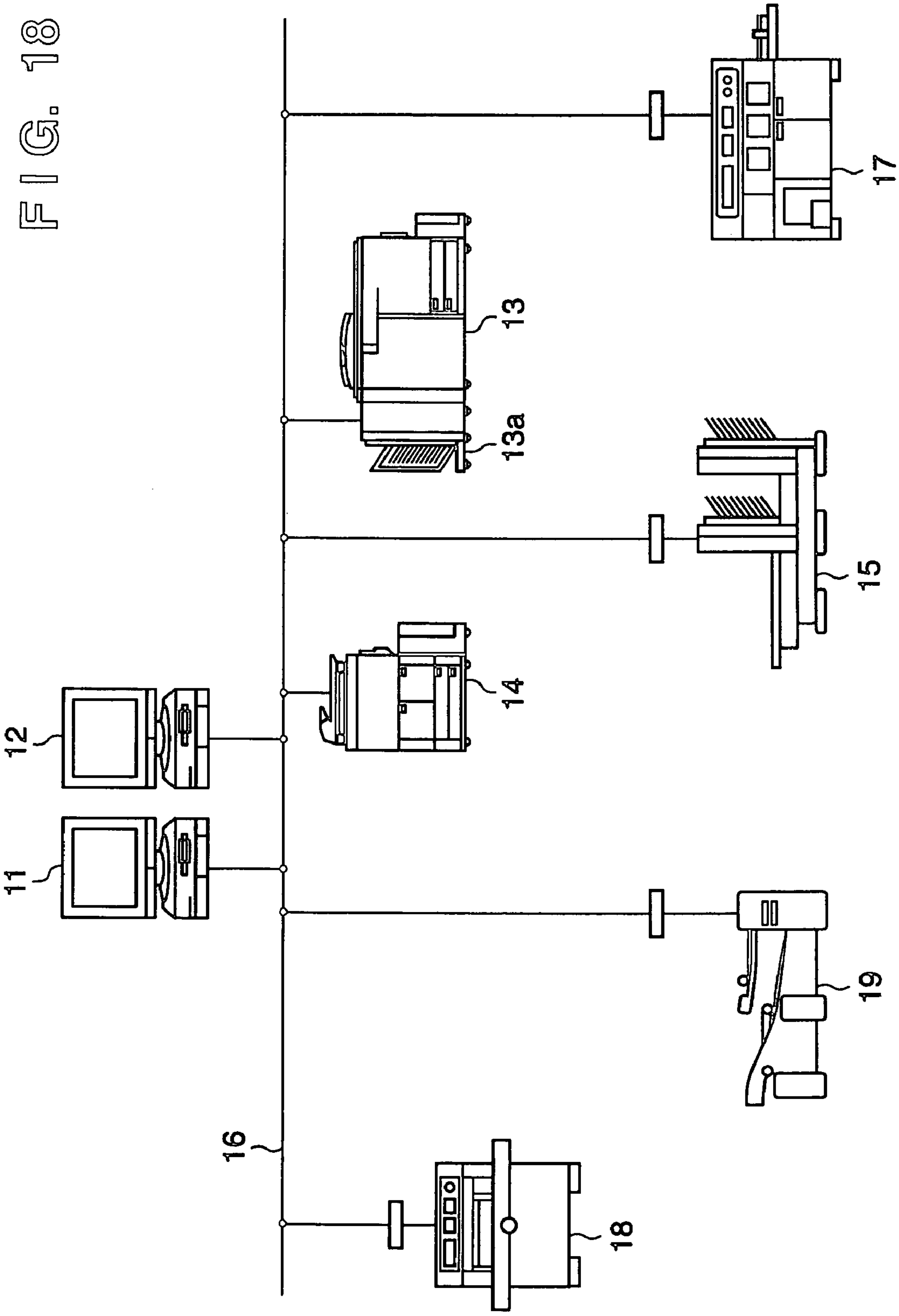
FIG. 18 illustrates the configuration of the printing system according to a second embodiment of the present invention.

FIG. 18 illustrates the configuration of the printing system according to the second embodiment. In the printing system according to the first embodiment in FIG. 1, near-line finishers 17 to 19 are newly connected to the network 16.

FIG. 19 is a flowchart showing a procedure for registering a finisher in the image forming apparatus. When the user installs a new finisher and connects it to the network 16, connection of the new finisher is detected at step S301. For the detection of the new finisher, the IP address of the new finisher is inputted via the operating unit of the image forming apparatus, thereby the image forming apparatus can recognize the finisher. Note that the recognition of the finisher may be performed by any other method.

Next, at step S302, a user interface for changing the status of the connected finisher to a connected status by the operation panel of the image forming apparatus is displayed. Next, the connection operation using the user interface will be described with reference to FIGS. 20 to 22.

Figure 20:
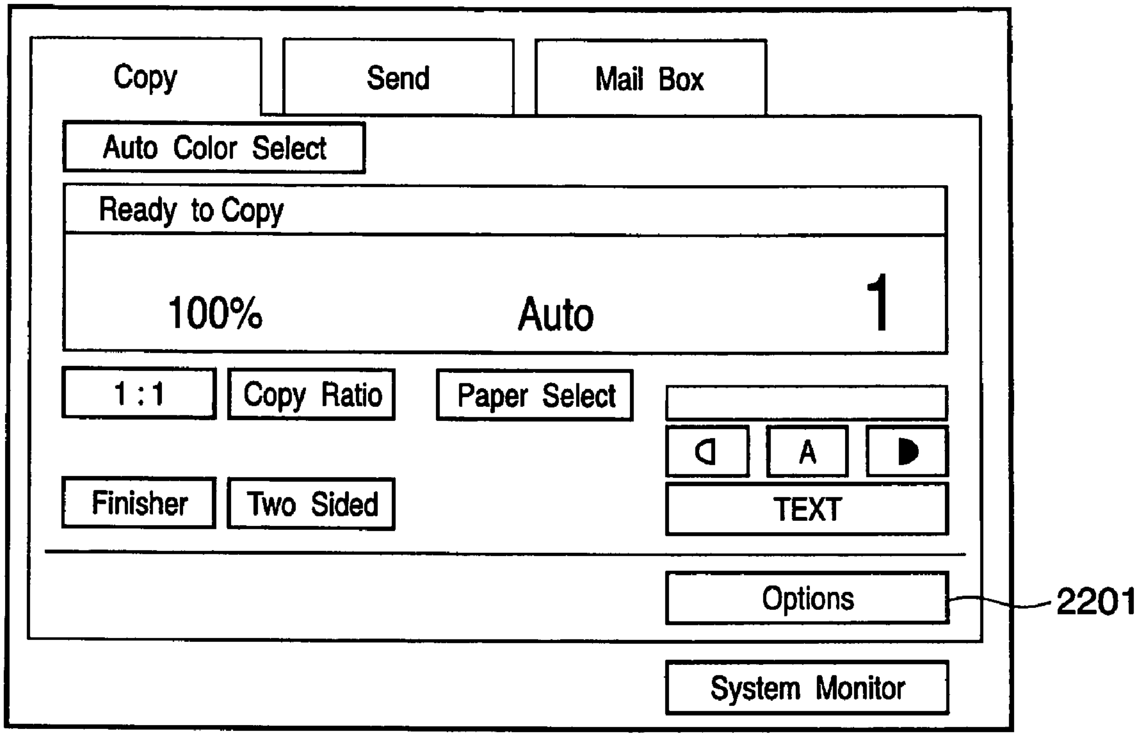
FIG. 20 illustrates an initial display status of an operation screen in an operation unit 313 of the image forming apparatus 13.
Figure 21:
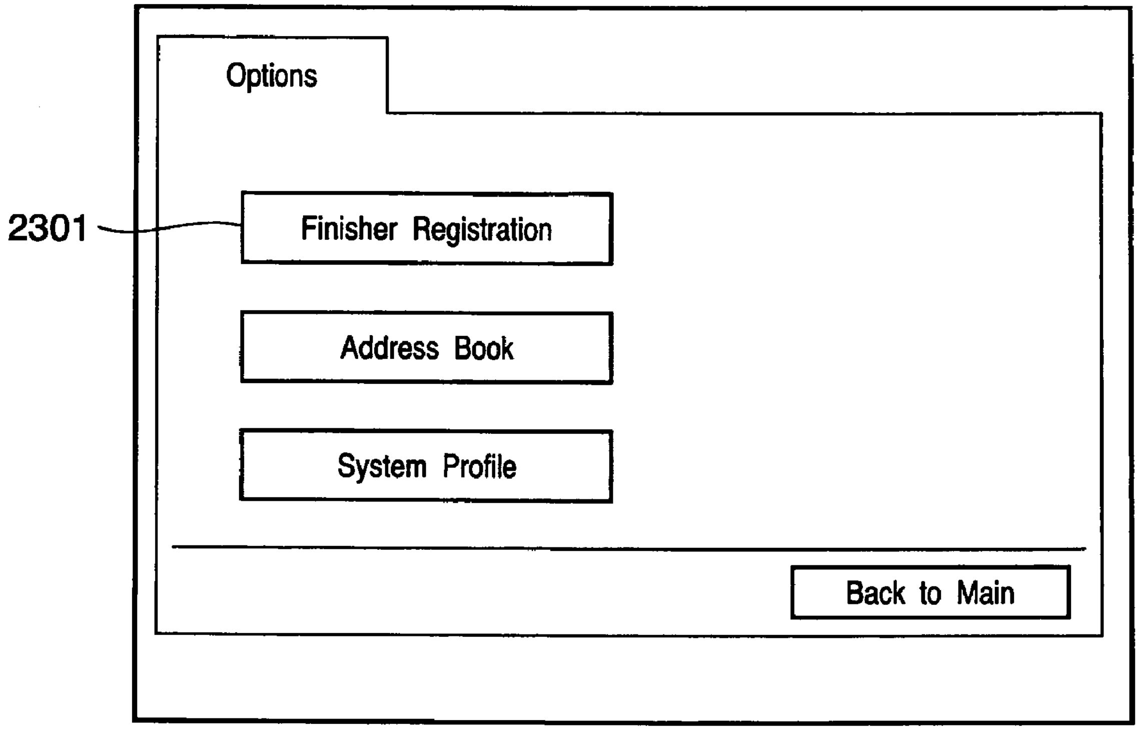
FIG. 21 illustrates the operation screen displayed in correspondence with depression of an Options button 2201 in FIG. 20.

FIG. 20 illustrates an initial display status of an operation screen in an operation unit 313 of the image forming apparatus 13. To perform finisher connection setting, the user first depresses an Options button 2201 in FIG. 20. The button 2201 is used for option setting of the image forming apparatus. By the depression of the button 2201, an operation screen in FIG. 21 is displayed. Then the user depresses a "Finisher Registration" button 2301 in FIG. 21. By the depression of the button 2301, a finisher connection registration screen in FIG. 22 is displayed.

Figure 22:
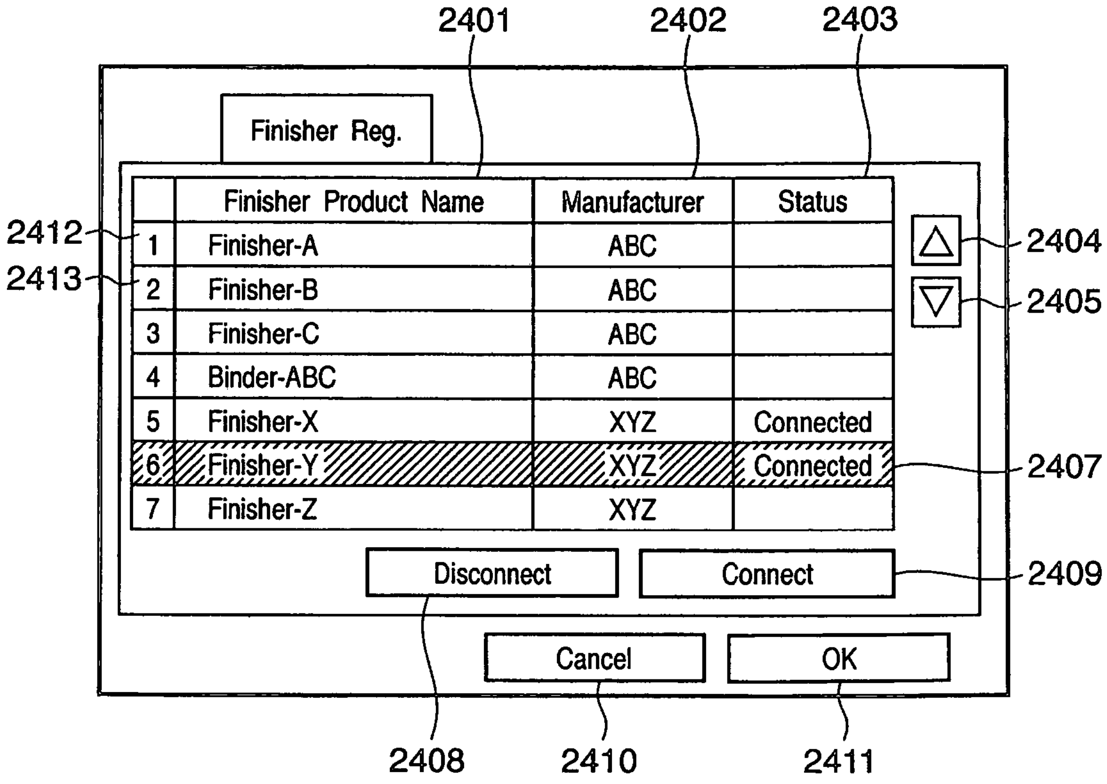
FIG. 22 is an example of a finisher connection registration screen.

In the finisher registration screen shown in FIG. 22, a list of registrable finishers is displayed and connection registration of the respective finishers can be performed. The list has a finisher name 2401, a maker name 2402, and a connection status 2403. In the list, seven finishers are displayed at once. To browse finishers prior and subsequent to these seven finishers, buttons 2404 and 2405 to scroll up and down the display list are depressed.

The connection registration and cancellation of connection registration using the finisher registration screen in FIG. 22 are performed as follows. First, a subject finisher is set to a selected status by touching a part of a column displaying the subject finisher. In FIG. 22, a column 2407 is in a selected status. In this status where the desired finisher is selected, the finisher in the selected status is connection-registered by touching a "Connect" button 2409, and the connection status of the finisher in the selected status is released by touching a Disconnect button 2408.

Hereinbelow, the connection registration of a Finisher-Y (near-line finisher 17), a Finisher-A (near-line finisher 18), a Finisher-B (near-line finisher 19) with respect to the system configuration of the first embodiment (FIG. 1) as shown in FIG. 18 will be described.

First, to register the Finisher-Y, the Finisher-Y is set to a selected status by touching a part of the column 2407. Next, the finisher is connection-registered by touching the "Connect" button 2409. Similarly, to connection-register the Finisher-A and the Finisher-B, the above registration operation is performed with respect to columns 2412 and 2413. In this manner, the Finisher-Y (near-line finisher 17), the Finisher-A (near-line finisher 18) and the Finisher-B (near-line finisher 19) become in the "Connect" status.

Finally, when an "OK" button 2411 is touched, the above-described setting is enabled, and the initial screen of the operation panel of the image forming apparatus main body is restored. Note that when the above registration operation is cancelled, a "Cancel" button 2410 is touched. By this operation, the contents of the above-described operation are cancelled, and an update operation of the finisher management table of the image forming apparatus to be described later is not performed.

By the depression of the OK button 2411, the process proceeds to step S303, at which the image forming apparatus updates the finisher management table 52. Hereinbelow, the update processing of the finisher management table 52 will be described. In the finisher connection registration screen in FIG. 22, as the user connection-registered the Finisher-Y by XYZ company, the Finisher-A by ABC company and the Finisher-B by ABC company, the finisher management table 52 in FIG. 7 is updated. In accordance with the connection registration, columns of management numbers #1, #2 and #6 (Finisher-Y, Finisher-A and Finisher-B) are written from "false" to "true". FIG. 23 shows the finisher management table 52 in which such update has been performed on the status in FIG. 7. As shown in FIG. 23, the connection status of the Finisher-A, the Finisher-B and the Finisher-Y of management numbers #1, #2 and #6 as the management number 101 are changed to "true".

In the above procedure, the connection registration of the finishers installed by the user is completed. Note that in the present embodiment, the user connects the finishers and then performs the finisher connection registration with the operation panel of the image forming apparatus, however, the setting can be performed by any other method as long as the finisher management table can be updated. For example, as the image forming apparatus and the finishers are connected via a communication medium, it may be arranged such that the image forming apparatus automatically connection-registers the finishers by defining a protocol upon connection and performing communication by the image forming apparatus and the finishers based on the protocol.

Thereafter, when the client PC 11 performs collection of ability information (FIG. 8) at predetermined timing such as polling by the above-described finisher profile acquisition method, the updated ability information is obtained from the image forming apparatus 13. Accordingly, the client PC 11 updates the function table 130 in accordance with the obtained ability information. Hereinbelow, the update processing of the function table will be described.

[Update of Function Table]

The print setting application 27*a* refers to the finisher management table, and updates the previously held bookbinding table as shown in FIG. 11B utilizing the profiles of the newly-added finishers. FIG. 24 shows the bookbinding table corresponding to the present embodiment. Note that in this example, a cutting machine (near-line finisher 18), and a folding machine (near-line finisher 19) are displayed in the bookbinding table; however, these finishers may be managed in another function table.

In this manner, when the function table has been updated, the wizard generator 140 determines whether or not unconformity has occurred between the updated content and the generated wizard. When unconformity has occurred, i.e., new function(s) has been added or function(s) has been deleted, the wizard is re-constructed.

For example, as shown in FIG. 24, when a case bookbinding function has been added as a stitching function, "case bookbinding" is added to the screen in which the user designates a bookbinding printing method as shown in FIG. 14, and at the same time, a screen for setting information specific to a case bookbinding machine is generated. Further, in addition to addition/deletion of finisher, similar processing is performed for addition/deletion of image forming apparatus.

As described above, according to the second embodiment, the update processing of the function table is performed and the wizard is re-constructed in a flexible manner, in correspondence with a change of printing system configuration.

Third Embodiment

[Dynamic Reconstruction by Wizard+DeviceConfig Information]

When the print setting application 27*a* has been started, the status information of the respective devices stored in the profile storage area 23 or the device table is obtained. Then it is checked whether or not there is a device having a trouble in its operation (out of consumable goods, failure, busy or the like) based on the status information. When there is a device having a trouble in its operation, a flag is set in the function table so as to disable selection of the device.

When there is a device for which the above flag is set, the wizard generator specifies a screen related to the device in condition branching of a previously-generated wizard, and reconstructs the wizard screen not to select the device. Further, when there are other screens (setting conditions) influenced by the reconstruction of the wizard screen, the construction of the screens are sequentially changed.

As described above, according to the third embodiment, the wizard screen can be constructed in accordance with finisher status. For example, as the wizard screen can be constructed such that a finisher having a trouble in its operation is excluded from subjects of selection, a reliably available device can be automatically selected. Thus the operability is improved.

As described above, the present invention facilitates a user's selection and setting of a device necessary for obtaining the user's desired final product.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-128621 filed on Apr. 26, 2005, which is hereby incorporated by reference herein in its entirety.

What is claimed is:

1. An information processing apparatus connectable to plural devices, comprising:

a holding unit configured to hold function information indicating abilities regarding plural function items of said plural devices;

a comparing unit configured to compare the function information of said plural devices for a predetermined function item of the plural function items;

an interface unit configured to provide a user interface for displaying selecting options of different function information for the predetermined function item in a case that said comparing unit determines that the function information of said plural devices is different for the predetermined function item, and not to provide the user interface for the predetermined function item in a case that said comparing unit determines that the function information of said plural devices is the same for the predetermined function item; and a narrow-down unit configured to narrow down available devices based on selection of said selecting options of the user interface provided by said interface unit.

2. The apparatus according to claim 1, wherein, when a device has not been determined by repeated execution of processing of said interface unit and said narrow-down unit, said narrow-down unit applies a predetermined selection rule and determines a device.

3. The apparatus according to claim 1, wherein status information of said plural devices is collected, and a device having a trouble in its operation is excluded from subject devices for said interface unit and said narrow-down unit.

4. A control method for an information processing apparatus connectable to plural devices which comprises a holding unit configured to hold function information indicating abilities regarding plural function items of the plural devices, said method comprising:

a comparing step of comparing the function information of the plural devices for a predetermined function item of the plural function items;

an interface step of providing a user interface for displaying selecting options of different function information for the predetermined function item in a case that it is determined in said comparing step that the function information of the plural devices is different for the predetermined function item, and not providing the user interface for the predetermined function item in a case that it is determined in said comparting step that the function information of the plural devices is the same for the predetermined function item; and a narrow-down step of narrowing down available devices based on selection of said selecting options of the user interface provided in said interface step.

5. The method according to claim 4, wherein, when a device has not been determined by repeated execution of said interface step and said narrow-down step, at said narrow-down step, a predetermined selection rule is applied and a device is determined.

6. The method according to claim 4, wherein status information of the plural devices is collected, and a device having a trouble in its operation is excluded from subject devices at said interface step and said narrow-down step.

7. A non-transitory computer readable storage medium storing a program for causing a computer to execute a control method in claim 4.

* * * * *